(12) United States Patent
DeMuth et al.

(10) Patent No.: US 12,277,139 B2
(45) Date of Patent: Apr. 15, 2025

(54) STORAGE SPACE DETERMINATIONS FOR SNAPSHOTS

(71) Applicant: HEWLETT PACKARD ENTERPRISE DEVELOPMENT LP, Spring, TX (US)

(72) Inventors: Tessa DeMuth, Ft. Collins, CO (US); Matthew S. Gates, Houston, TX (US); Monica Jane Kinney, Boise, ID (US); Christopher Robert Nichols, Meridian, ID (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 56 days.

(21) Appl. No.: 18/308,312

(22) Filed: Apr. 27, 2023

(65) Prior Publication Data

US 2024/0362249 A1    Oct. 31, 2024

(51) Int. Cl.
*G06F 16/27* (2019.01)
*G06F 16/23* (2019.01)

(52) U.S. Cl.
CPC .......... *G06F 16/27* (2019.01); *G06F 16/2365* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 7,240,172 B2 | 7/2007 | Chong, Jr. et al. | |
| 7,680,842 B2 | 3/2010 | Anderson et al. | |
| 7,886,119 B1 | 2/2011 | Cameron et al. | |
| 8,914,567 B2 | 12/2014 | Miroshnichenko et al. | |
| 9,928,003 B2 | 3/2018 | Barve et al. | |
| 9,952,767 B2 | 4/2018 | Zheng et al. | |
| 10,846,279 B2 | 11/2020 | Kimura | |
| 11,003,542 B1* | 5/2021 | Kucherov | G06F 11/1471 |
| 11,099,940 B1 | 8/2021 | Patel et al. | |
| 11,100,094 B2* | 8/2021 | Lu | G06F 16/22 |
| 11,169,889 B1* | 11/2021 | Warfield | G06F 3/0653 |

(Continued)

FOREIGN PATENT DOCUMENTS

EP    3995964 A1    5/2022

OTHER PUBLICATIONS

"NetApp Block Ownership", NetApp, Jul. 21, 2020, 11 pages.

(Continued)

*Primary Examiner* — Kim T Nguyen
(74) *Attorney, Agent, or Firm* — Trop, Pruner & Hu, P.C.

(57) ABSTRACT

In some examples, a system maintains, for a base storage structure and a collection of snapshots associated with the base storage structure, statistics relating to usage of storage space based on data of the base storage structure and the collection of snapshots. The system checks metadata of a first snapshot to determine validity of references in the metadata and a presence of any child of the first snapshot or a grandparent of the first snapshot. The system associates, based on the validity of the references in the metadata and the presence of any child or grandparent of the first snapshot, a hint with a metadata entry of a parent of the first snapshot to indicate that a metadata entry of the child or the grandparent is to be checked. The system updates, using the hint, the statistics relating to usage of storage space.

20 Claims, 14 Drawing Sheets

(56) References Cited

U.S. PATENT DOCUMENTS

| | | | |
|---|---|---|---|
| 11,397,650 B1* | 7/2022 | Palaiah | G06F 11/1448 |
| 11,847,095 B1* | 12/2023 | Bassov | G06F 16/162 |
| 11,892,983 B2* | 2/2024 | Bono | G06F 16/13 |
| 2018/0004798 A1 | 1/2018 | Kimura | |
| 2018/0011892 A1 | 1/2018 | Kimura | |
| 2020/0167238 A1 | 5/2020 | Killamsetti et al. | |
| 2020/0250135 A1 | 8/2020 | Leis et al. | |
| 2020/0250136 A1 | 8/2020 | Ballal et al. | |
| 2021/0049157 A1* | 2/2021 | Lu | G06F 16/27 |
| 2021/0263910 A1* | 8/2021 | Xiao | G06F 16/27 |
| 2024/0311254 A1* | 9/2024 | Gupta | G06F 11/1469 |
| 2024/0311363 A1 | 9/2024 | Murray et al. | |
| 2024/0362249 A1* | 10/2024 | DeMuth | G06F 16/2365 |

OTHER PUBLICATIONS

Oracle, "Disk Space Accounting for ZFS Snapshots", 2010, 1 Page.

Oracle, "Snapshot Space Accounting", 2010, 1 page.

NetApp, "What is a Block Ownership Calculation Scanner?," Feb. 2, 2023, <https://web.archive.org/web/20230202183314/https://kb.netapp.com/Advice_and_Troubleshooting/Data_Storage_Software/ONTAP_OS/What_is_a_Block_Ownership_Calculation_Scanner%3F>, 13 pages.

Oracle Corporation, "Snapshot Space Accounting," 2010, <https://docs.oracle.com/cd/E19120-01/open.solaris/817-2271/gbcxc/index.html>, 1 page.

\* cited by examiner

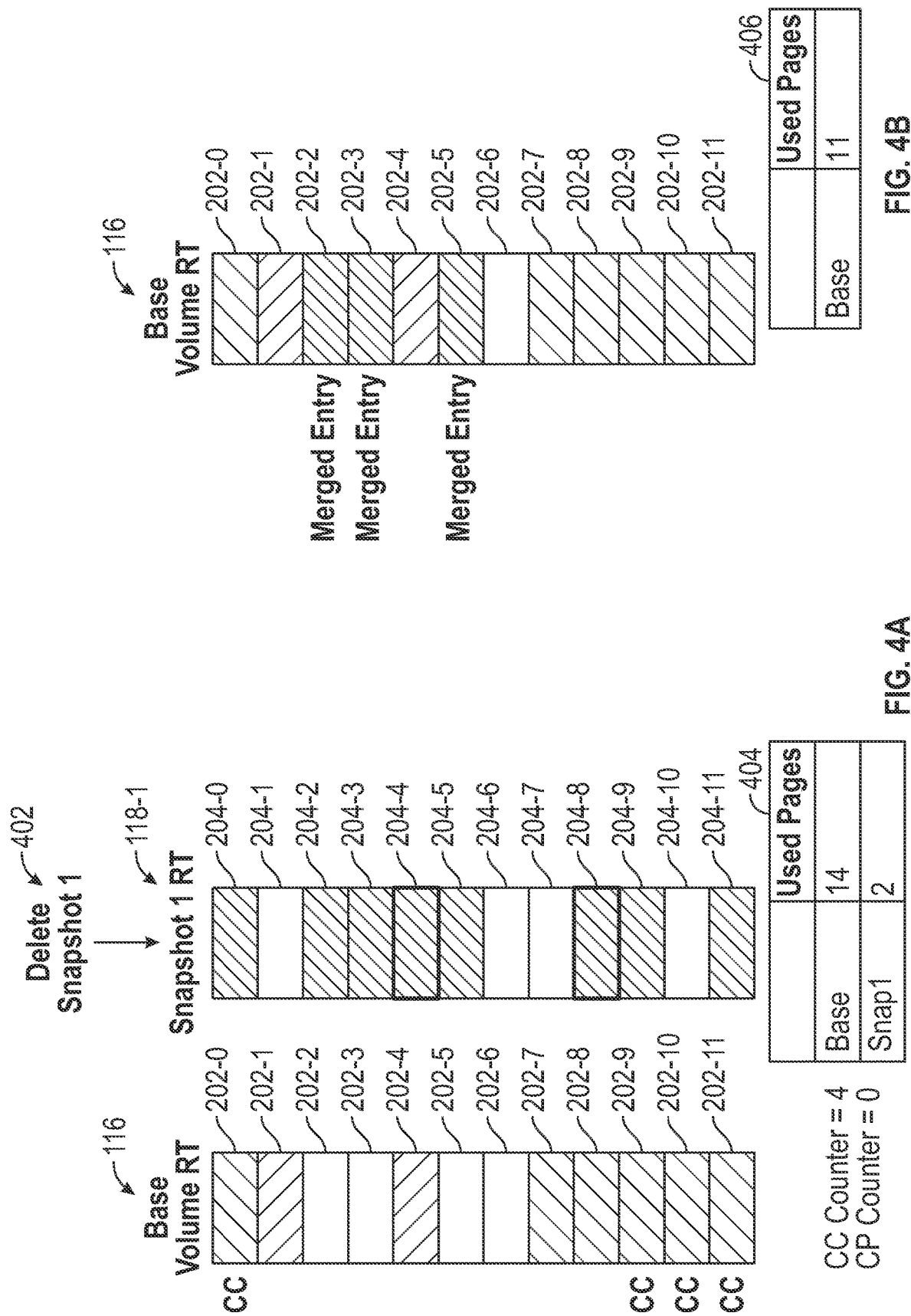

STORAGE SPACE DETERMINATIONS FOR SNAPSHOTS

BACKGROUND

A storage system can store data in a storage volume, which is a logical container of data that can be stored on one or more storage devices of the storage system. In some cases, snapshots of a storage volume can be taken. A snapshot is a point-in-time copy of the storage volume. Different snapshots can be taken at different points in time.

BRIEF DESCRIPTION OF THE DRAWINGS

Some implementations of the present disclosure are described with respect to the following figures.

FIGS. 2A-2G, 3A-3B, 4A-4B, and 5A-5B illustrate examples of maintenance statistics of base volumes and snapshots using hints according to some examples.

Figure 1:
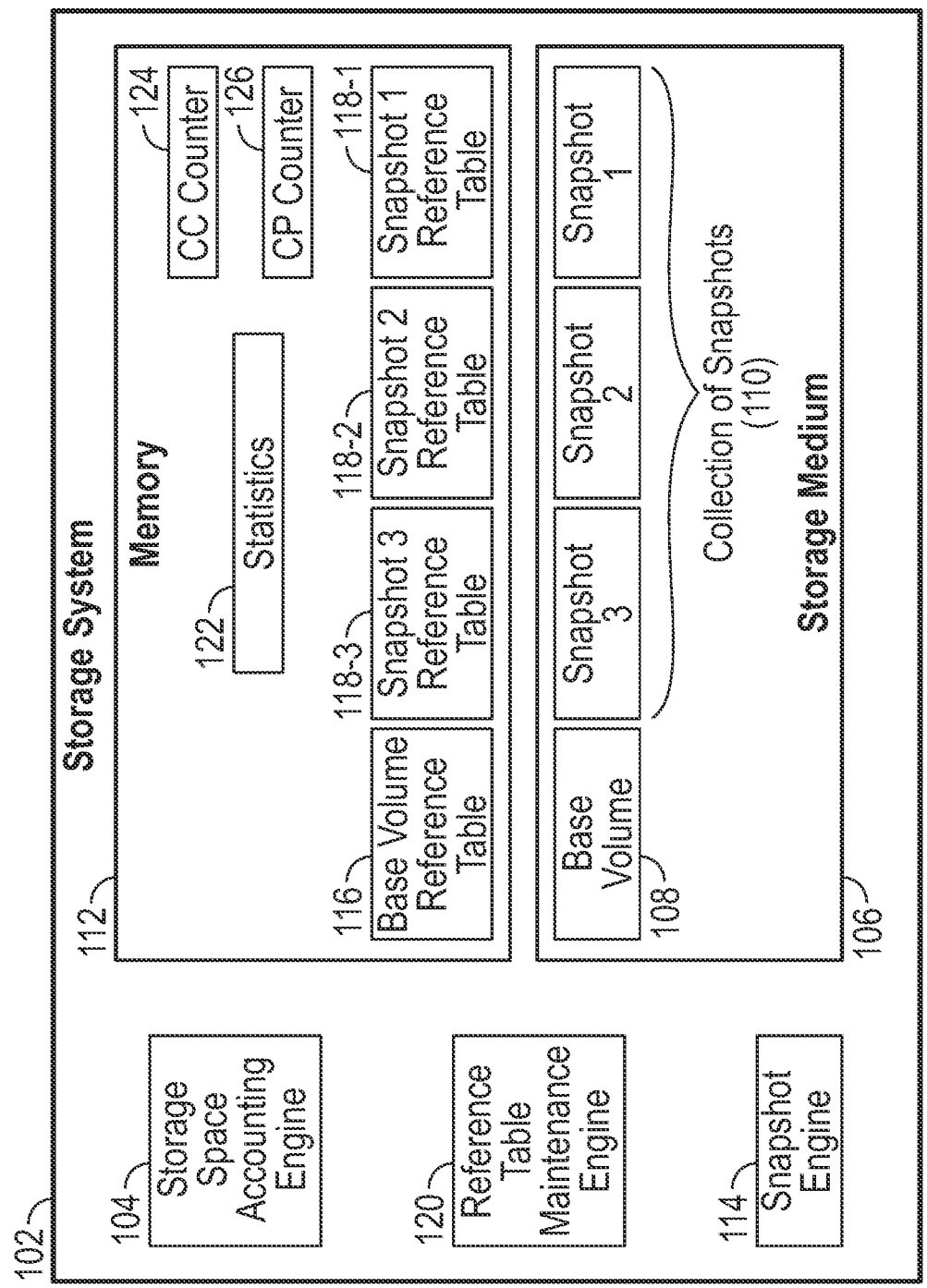
FIG. 1 is a block diagram of an arrangement that includes a storage system that has a storage space accounting engine according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A storage volume for which a collection of snapshots has been created can be referred to as a "base volume." As used here, a "collection" of items can refer to a single item or multiple items. Thus, a collection of snapshots can include a single snapshot or multiple snapshots. A base volume includes a collection of pages of data, where each page of data occupies a specified amount of storage space. A "page" of data can refer to any unit of data of any specified size.

A first snapshot of a base volume taken at a first point in time can include a copy of pages of data present in the base volume at the first point in time. Metadata can be maintained for the base volume to indicate the presence of pages of data in the base volume. As described below, a base volume includes a reference table including valid entries referring to storage locations for pages of data of the base volume, and invalid entries not referring to any storage location. In examples described herein, a snapshot of a base volume is taken by creating a new, empty reference table (i.e., having all invalid entries) for the base volume, re-assigning the reference table of the base volume (at the point in time that the snapshot is taken) to the snapshot, and then assigning the empty reference table to the base volume. In such examples, an invalid entry in a reference table may provoke examination of a corresponding entry of a reference table of an earlier snapshot to locate data. Each time an invalid entry is found, and progressively earlier snapshot may be examined until either a valid entry is found, or an earliest snapshot is found to contain an invalid entry, indicating that the page corresponding to that entry is empty.

After the first snapshot at the first point in time, a second snapshot can be taken of the base volume at a later second point in time. The second snapshot may be considered an incremental snapshot as the second snapshot includes a reference table with valid entries for pages of data of the base volume that have changed since the first point in time when the first snapshot was taken.

Each of the base volume, the first snapshot, and the second snapshot can consume a respective amount of storage space in a storage system. For a base volume with no snapshots, as data is written to the base volume, the used storage space consumed by the base volume increases. When a snapshot is created based on the base volume, the snapshot and the base volume can both refer (directly or indirectly) to at least one page of data that occupies a certain amount of storage space. For example, a reference table of the snapshot may contain an entry with a valid reference to a page of data (i.e., directly refer to the page), while the corresponding entry in the reference table of the base volume after the snapshot includes an invalid reference, thereby indirectly referring to the corresponding valid entry in the reference table of the snapshot (i.e., via the progressive examination of earlier snapshots described above). Such storage space occupied by a page of data referred to directly by one snapshot and indirectly by the base volume (and/or another snapshot) is considered storage space that is "shared" between the snapshot and the base volume and/or other snapshot(s). As further snapshots are created based on the base volume, the different snapshots may refer to at least one page of data that occupies storage space shared between the snapshots. A "shared page of data" is a page of data that is referred to (directly or indirectly) by multiple ones of a base volume and one or more snapshots. A "unique page of data" (also referred to as a "non-shared page of data") is a page of data that is referred to only by a single snapshot (i.e., "uniquely owned" by the snapshot) or that is referred to only by the base volume (i.e., "uniquely owned" by the base volume). For example, a unique page of a base volume is referred to by the base volume but not referred to (i.e., indirectly) by any snapshot of the base volume. A unique page of a given snapshot is referred to by the given snapshot but not referred to (e.g., indirectly) by the base volume or any other snapshot of the base volume.

In some cases, it may be desirable to determine how much storage space is consumed by a given snapshot. However, due to the possibility that the given snapshot may share storage space with at least one other snapshot or the base volume, it may be difficult to efficiently determine the storage space occupied by data unique to the given snapshot (i.e., the amount of space that would be freed by deleting the given snapshot), since this determination would exclude storage space for data shared with at least one other snapshot or the base volume. The determination of the storage space occupied by data unique to the given snapshot is even more challenging if the given snapshot is an intermediate snapshot (i.e., a snapshot taken at a point in time later than at least one other snapshot). Similarly, determining storage space occupied by a base volume may be challenging since the base volume may include data unique to the base volume and may further share data with one or more snapshots.

It is not efficient to perform an in-line storage space accounting analysis of metadata associated with the base volume and each snapshot of the associated collection of snapshots to determine the amount of storage space uniquely consumed by each snapshot and/or the base volume. An in-line storage space accounting analysis refers to an analysis that is performed as part of data operations involving the base volume and its snapshots. Additionally, there may be constraints regarding availability of metadata of snapshots in the collection. When an operation is being performed on a given snapshot (e.g., an operation to delete the given snapshot), metadata associated with later snapshot(s) or earlier snapshot(s), which may be involved in performing the storage space accounting analysis, may not be readily accessible (e.g., in memory). As a result, it may not be practical or efficient to perform the analysis to determine the storage space uniquely consumed by the given snapshot and/or the storage space of the base volume in-line with data operations. For example, copying metadata of snapshot(s) not involved in a data operation for the purpose of the storage space accounting analysis may delay completion of the data operation.

In accordance with some implementations of the present disclosure, a system associates hints with a base volume or a snapshot to indicate which metadata entries of child snapshots or parents (the base volume or another snapshot) are to be considered when performing storage space accounting in response to an operation involving a given snapshot (e.g., a deletion of the given snapshot). A "hint" can refer to an indicator, such as implemented using a flag, a field, or any other information element. A "child" of a given snapshot refers to a snapshot taken at an earlier point in time than the given snapshot. A "parent" of the given snapshot refers to the base volume or a snapshot taken at a later point in time than the given snapshot. The storage space accounting can be a background process that uses the hints to avoid having to consider all metadata entries of a child or parent when performing the storage space accounting analysis.

The system maintains, for the base volume and a collection of snapshots associated with the base volume, statistics relating to usage of storage space based on data stored by the base volume and the collection of snapshots. The statistics are computed based on metadata associated with the base volume and the snapshots. In some examples, the metadata includes reference tables (which are examples of translation tables or exception tables). A reference table contains multiple entries, where an entry can include a valid reference or an invalid reference.

For a reference table of a base volume or a snapshot, an entry of the reference table that contains a valid reference indicates that a respective page of data exists in the base volume or snapshot associated with the reference table. The reference table entry contains a valid reference if the reference table entry contains mapping information that maps between different storage address spaces, such as between a logical or virtual storage address space that includes logical storage addresses and a physical storage address space that includes physical storage addresses. For example, a reference table entry can contain mapping information that maps a virtual or logical storage address of a page of data to a corresponding physical storage address in a storage system where the data of the page is stored. An entry of the reference table that contains an invalid reference (i.e., the reference table entry does not include the mapping information) indicates that the respective page of data is empty in the associated base volume or snapshot or that the page of data may be referenced by a reference table of a snapshot of an earlier point in time.

A "storage address" can refer to information that identifies a storage location of data. A physical storage address refers to where the data is physically stored in a storage system. A logical storage address (also referred to as a virtual storage address) refers to a storage address used by machine-readable instructions of a system, such as by an operating system (OS) or an application program.

In an example, in response to a read request targeting the base volume, the system consults the corresponding entry of the reference table for the base volume to determine if the corresponding entry contains a valid reference or an invalid reference. If the corresponding entry contains a valid reference, the system retrieves the respective page of data from the base volume for the read request. However, if the corresponding entry contains an invalid reference, the system consults the corresponding entry of a snapshot reference table associated with the most recent snapshot to determine if the corresponding snapshot reference table entry contains a valid reference. If so, the system retrieves the respective page of data from the most recent snapshot for the read request. If the corresponding snapshot reference table entry contains an invalid reference, the system consults the snapshot reference table for the second most recent snapshot. The process continues with reference tables of successively less recent snapshots until a valid reference is found, or until an invalid reference is found the earliest snapshot.

In other examples, a read request can target a snapshot. A read request targeting a snapshot is a request that seeks to read data of the snapshot. In response to such a read request, the system consults the corresponding entry of the reference table for the snapshot to determine whether a valid reference is present, and if not, can successively consult reference tables of earlier created snapshots.

The system checks metadata (e.g., reference tables) of a given snapshot to determine a validity of references in the metadata and a presence of any child of the given snapshot or a grandparent of the given snapshot. A grandparent of a snapshot refers to the immediate parent of the snapshot's immediate parent. An immediate parent of the snapshot is the parent with no intermediate snapshot between the parent and the snapshot. Similarly, an immediate child of a snapshot is the child with no intermediate snapshot between the snapshot and the child. The grandparent of the given snapshot will exist if at least one later snapshot of the same base volume was taken at a later point in time than the given snapshot (if there is only one later snapshot, the grandparent is the base volume). The system associates, based on the validity of references in the metadata of the given snapshot and the presence of any child or grandparent, a hint with a metadata entry of a parent of the given snapshot to indicate that the respective metadata entry of the child or the grandparent is to be checked for determining storage space uniquely used by the given snapshot. Using the hint, the system can perform a background process to determine an amount of unique storage space used by the given snapshot. A "background process" can refer to a process that can be initiated independently of data operations involving a base volume and/or a collection of snapshots associated with the base volume. The background process may be performed at any time during or after the data operations, such as during times when usage of system resources is low (e.g., below a resource usage threshold).

The storage space accounting can be used for various purposes. For example, a system can track usage of storage space by a base volume and/or snapshots. A system (or an administrator) may use the output of the storage space accounting to determine how much space may be reclaimed if any given snapshot were to be deleted. Also, the system (or the administrator) may use the output of the storage space accounting to decide whether a base volume or a snapshot is to be migrated from one location to another location.

FIG. 1 is a block diagram of an example arrangement that includes a storage system 102, which includes a storage space accounting engine 104 according to some implementations of the present disclosure. Although FIG. 1 shows the storage space accounting engine 104 as being in the storage system 102, in other examples, the storage space accounting engine 104 can be external of the storage system 102.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits. The engine can be part of a computer or an arrangement of multiple computers.

The storage space accounting engine 104 performs storage space accounting for a snapshot as discussed herein. The storage space accounting can be based on metadata of a base volume and associated snapshot(s) (the snapshot(s) created from the base volume) stored in the storage system 102.

The metadata for the base volume and the associated snapshot(s) can include reference tables. A reference table can also be referred to as an exception table. The reference table includes multiple entries. A reference table entry contains a valid reference if a corresponding page of data exists in the base volume or snapshot associated with the reference table. The reference table entry does not contain a valid reference if the corresponding page of data is empty in the base volume or snapshot associated with the reference table or if the corresponding page of data is referenced by a reference table of a snapshot of an earlier point in time. In the ensuing discussion, a reference table entry that does not contain a valid reference is referred to as including an invalid reference.

The storage system 102 includes a storage medium 106, which can be implemented using a collection of storage devices. Examples of storage devices include any or some combination of the following: disk-based storage devices, solid state drives, and so forth.

The storage medium 106 stores a base volume 108 and a collection of snapshots 110 associated with the base volume 108. The collection of snapshots 110 includes snapshot 1 created at a first point in time, snapshot 2 created at a second point in time later than the first point in time, and snapshot 3 created at a third point in time later than the second point in time. The collection of snapshots 110 form a tree of snapshots created at successively earlier times (when viewed from left to right in FIG. 1). In the example of FIG. 1, three snapshots have been created either directly or indirectly from the base volume 108. In other examples, less than three or more than three snapshots can be created from the base volume 108. A snapshot may be indirectly created from the base volume 108 if a read-write snapshot was taken of the base volume, and a read-only snapshot is then taken of the read-write snapshot. A read-write snapshot is a snapshot that can be read or written to. A read-only snapshot is a snapshot that can be read from but not written to. In some examples, it is assumed that snapshots 1, 2, and 3 are read-only snapshots.

Although FIG. 1 shows an example where just one base volume is stored in the storage medium 106, in other examples, there may be multiple base volumes in the storage medium 106 with associated collections of snapshots.

As noted above, a given snapshot for a given point in time for a base volume can have a "parent" which may refer to a later snapshot or the base volume itself. When snapshot(s) for point(s) in time later than the given point in time exists for the base volume, the succeeding snapshot immediately after the given snapshot is the parent of the given snapshot. When no snapshot later than the given point in time exists, the base volume is the parent of the given snapshot. In some cases, a given snapshot for a given point in time for a base volume can have a "child" snapshot. When snapshot(s) for point(s) in time earlier than the given point in time exists for the base volume, the preceding snapshot immediately before the given snapshot is the child of the given snapshot. A preceding snapshot immediately before the child snapshot of the given snapshot may be referred to herein as a "grandchild" of the given snapshot. For example, snapshot 3 has a parent that is the base volume 108, and a child that is snapshot 2. Snapshot 1 is a child of snapshot 2 and a grandchild of snapshot 3 (a child of the child of snapshot 1). The parent of snapshot 2 is snapshot 3, and the child of snapshot 2 is snapshot 1. The base volume 108 is a grandparent of snapshot 2. The parent of snapshot 1 is snapshot 2, and snapshot 1 does not have a child (since there is no snapshot created earlier than snapshot 1).

As used here, a "parent" can refer to an immediate parent of a snapshot, or an indirect parent such as a "grandparent" (i.e., a parent of a parent). In the example of FIG. 1, a parent of snapshot 2 can refer to snapshot 3 (the immediate parent) or the base volume 108 (the grandparent of snapshot 2). Similarly, the parent of snapshot 1 can include any of snapshot 2 (the immediate parent), snapshot 3 (the grandparent), or the base volume 108 (the great-grandparent). Stated differently, a parent of a given snapshot can refer to a base volume or any snapshot created later than the given snapshot.

A "child" of a base volume can refer to any snapshot of the base volume. A "child" of a given snapshot can refer to either the immediate child snapshot or any indirect child snapshot created at an earlier point in time than the given volume. For example, the child of the base volume 108 can refer to snapshot 3 (the immediate child), snapshot 2 (the grandchild), or snapshot 3 (the great-grandchild). The child of snapshot 3 can refer to any of snapshots 2 and 1.

Each of the base volume 108 and snapshots 1 to 3 stored in the storage medium 106 can be associated with metadata in the form of reference tables stored in a memory 112 of the storage system 102. The memory 112 can be implemented using a collection of memory devices, including any or some combination of the following: dynamic random access memory (DRAM) devices, static random access memory (SRAM) devices, flash memory devices, and so forth.

The storage system 102 further includes a snapshot engine 114 that manages the creation of the snapshots for a base volume, such as the base volume 108. The snapshot engine 114 can take a snapshot based on the base volume 108 in response to an event, such as a write event in which existing data of the base volume 108 is to be overwritten. In other examples, the snapshot engine 114 can take a snapshot in response to another event, such as a time-based event in which the snapshot engine 114 takes snapshots at scheduled times.

In the example of FIG. 1, a base volume reference table 116 is associated with the base volume 108, a snapshot 1 reference table 118-1 is associated with snapshot 1, a snapshot 2 reference table 118-2 is associated with snapshot 2, and a snapshot 3 reference table 118-3 is associated with a snapshot 3. The reference tables 116 and 118-1 to 118-3 are stored in the memory 112, and the reference tables are maintained by a reference table maintenance engine 120. The reference table maintenance engine 120 in some examples can be part of or separate from the snapshot engine 114.

Although FIG. 1 shows the reference tables 116 and 118-1 to 118-3 simultaneously in the memory 112, note that during operation fewer than all of the reference tables 116 and 118-1 to 118-3 may be present in memory 112 at the same time (e.g., some of the reference tables would not be added to the memory 112 until one or more reference tables in the memory 112 are removed).

The reference table maintenance engine 120 adds a reference to a reference table entry of a base volume or snapshot in response to a write of a respective page of data to the base volume (or to a read-write snapshot). A reference added to the reference table entry is referred to as a "valid reference." If no reference has been added to a reference table entry (i.e., the respective page of data has not yet been written to the base volume or snapshot), then the reference table entry has an "invalid reference."

The memory 112 also stores statistics 122 relating to usage of storage space of the storage medium 106 by each of the base volume 108 and snapshots 1 to 3. The statistics 122 are maintained by the storage space accounting engine 104, which updates the statistics 122 as snapshots are created and deleted and as writes occur to the base volume or any read-write snapshots. Examples of the statistics 122 are discussed below in connection with FIGS. 2A-2G, 3, 4A-4B, and 5A-5B.

As used here, a "deleted snapshot" can refer to a snapshot that has been deleted, is in the process of being deleted, or is the subject of a request for deletion. A "deletion" of a snapshot can refer to a completed deletion, an ongoing deletion, a requested deletion, or a deletion under consideration.

Figure 2B:
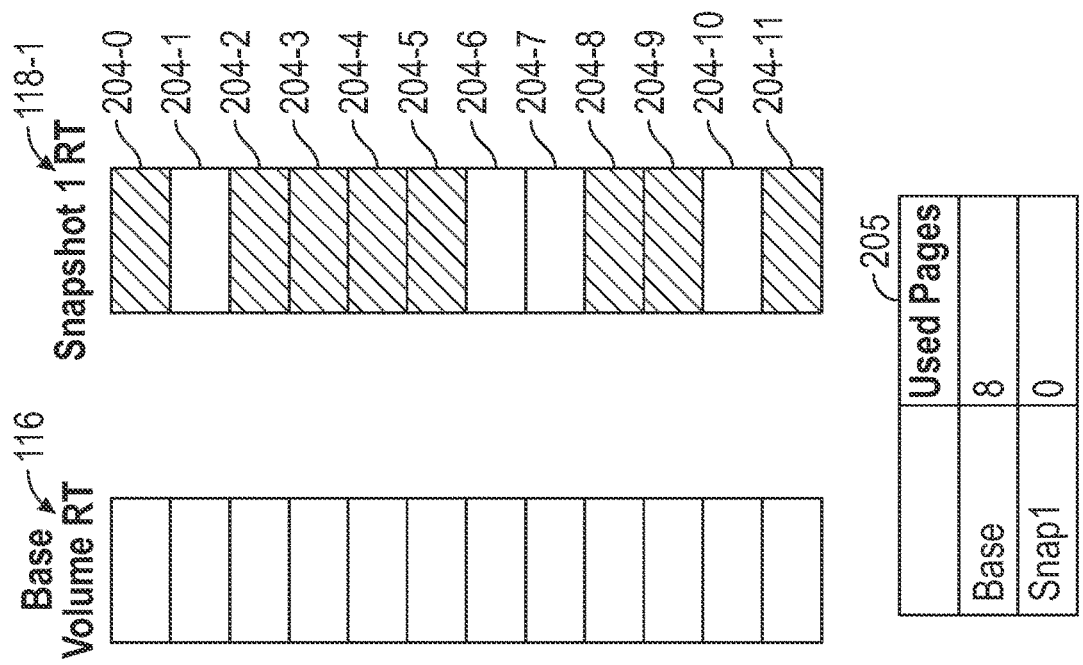
Figure 2A:
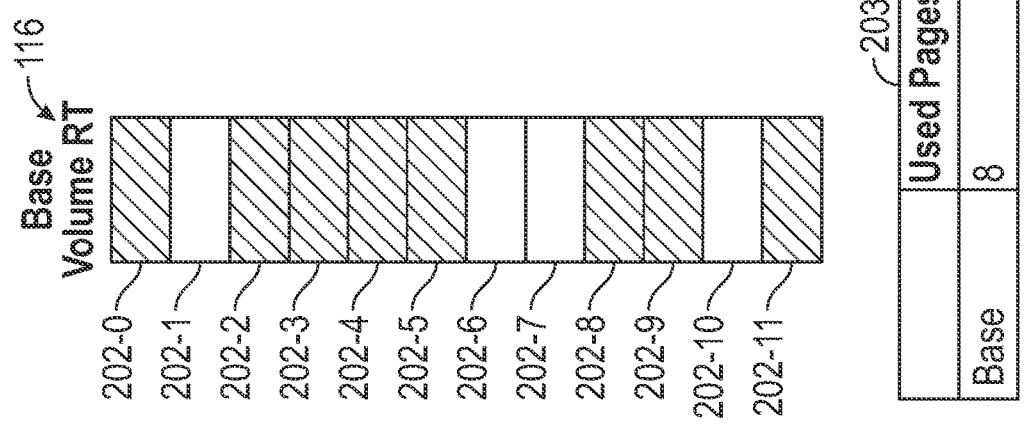

FIG. 2A shows an example of the base volume reference table (RT) 116 associated with the base volume 108 of FIG. 1. In the examples discussed herein, for simplicity of illustration, each reference table is shown having 12 entries (entries 0 to 11) that correspond to 12 pages of data in the respective base volume or snapshot. In other examples, a reference table can include a different quantity of entries (e.g., many more entries). The base volume reference table 116 has entries 202-0 to 202-11.

FIG. 2A further depicts a statistic 203 relating to used storage space for the base volume 108. In the example of FIG. 2A, the statistic 203 is in the form of a count of used pages referred to as a "used pages count," which indicates an amount of storage space consumed by the specified count of used pages in the base volume 108. In the example of FIG. 2A, the used pages count is 8, which indicates that the base volume has consumed the storage space corresponding to 8 pages of data. The statistic 203 is updated by the storage space accounting engine 104 as pages of data are written to the base volume 108.

In other examples, different statistics can be employed, such as a statistic specifying an amount of consumed storage space (e.g., expressed in megabits, gigabits, terabits, etc.).

The base volume reference table entries 202-0, 202-2, 202-3, 202-4, 202-5, 202-8, 202-9, and 202-11 (shaded) contain valid references, while the base volume reference table entries 202-1, 202-6, 202-7, and 202-10 (unshaded) contain invalid references (i.e., the corresponding pages are empty). The reference table maintenance engine 120 of FIG. 1 adds references to entries of base volume reference table 116 as corresponding pages of data are written to the base volume 108.

FIG. 2B shows an example after snapshot 1 of FIG. 1 has been taken of the base volume 108 at a time when the base volume 108 contains pages of data as shown in FIG. 2A (indicated by valid references in base volume reference table entries 202-0, 202-2, 202-3, 202-4, 202-5, 202-8, 202-9, and 202-11). In response to the creation of snapshot 1, the reference table maintenance engine 120 makes base volume reference table 116 empty (i.e., all invalid entries) and provides a reference table 118-1 for snapshot 1 containing the prior contents of base volume reference table 116 (shown in FIG. 2A). The snapshot 1 reference table 118-1 includes entries 204-0 to 204-11 that are equivalent to entries 202-0 to 202-11 of FIG. 2A, respectively. In some examples, the reference table maintenance engine 120 may first create an empty (all invalid) reference table for snapshot 1, and then swap the empty reference table of snapshot 1 with the base volume reference table 116 as illustrated in FIG. 2A, to arrive at the configuration shown in FIG. 2B. In other examples, the reference table maintenance engine 120 may cause the configuration of reference tables 116 and 118-1 as shown in FIG. 2B using any other suitable technique, such as by copying reference table 116 to create reference table 118-1, etc. Although the configuration of reference tables may be obtained through swapping, for ease of understanding, each reference table will maintain its own unique numbering (i.e., base volume reference table 116 will maintain entries 202-0 to 202-11, snapshot 1 reference table 118-1 entries are be labelled 204-0 to 204-11, though they may derive from entries 202-0 to 202-11).

Snapshot 1 reference table 118-1 is equivalent to the base volume reference table 116 shown in FIG. 2A prior to creation of snapshot 1. Snapshot 1 reference table entries 204-0, 204-2, 204-3, 204-4, 204-5, 204-8, 204-9, and 204-11 (shaded) contain valid references, while snapshot 1 reference table entries 204-1, 204-6, 204-7, and 204-10 (unshaded) contain invalid references.

After the creation of snapshot 1, the entries of the base volume reference table 116 are all invalid references (depicted as un-shaded in FIG. 2B). After the creation of snapshot 1, a lookup operation of the base volume 108 (e.g., in response to a read of the base volume 108) would find that each of the entries of the base volume reference table 116 contains an invalid reference, and in response, the lookup operation would access the snapshot 1 reference table 118-1 to determine whether the requested pages of data are referenced by valid entries in the reference table of snapshot 1.

FIG. 2B depicts statistics 205 associated with the base volume 108 and snapshot 1 as updated by the storage space accounting engine 104. The used pages count of the base volume 108 remains at 8, while the used pages count of snapshot 1 is 0. Note that the used pages count for the base volume 108 does not become zero just because snapshot 1 was created and the entries of the base volume reference table 116 are invalid. After snapshot 1 is created, the base volume 108 and snapshot 1 share the storage space consumed by pages of data referenced in snapshot 1 (the pages of data corresponding to snapshot 1 reference table entries 204-0, 204-2, 204-3, 204-4, 204-5, 204-8, 204-9, and 204-11).

The used pages count for the base volume 108 includes both the pages of data uniquely owned by the base volume 108 (and the storage space consumed by those pages) and the pages of data shared by any combination of the base volume and the snapshot(s) in a branch of the base volume 108 (and the storage space consumed by those pages), regardless of whether the base volume 108 itself shares those pages. An example of the used pages count for the base volume 108 including pages shared between snapshots, but not shared with base volume 108, is depicted in FIG. 2E.

A snapshot may either be a read-only snapshot or a read-write snapshot. The parent of a read-write snapshot is a read-only snapshot. The collection of a base volume and all its snapshots is referred to as a volume tree. A "branch" of the volume tree includes either the base volume or a read-write snapshot, and all read-only snapshots created from that base volume or read-write snapshot.

The used pages count for a read-only snapshot represents the storage space uniquely consumed by the read-only snapshot. On the other hand, the used pages count for a base volume or a read-write snapshot represents the storage space uniquely consumed by the base volume or the read-write snapshot as well as any storage space consumed by shared pages in the branch of the base volume or the read-write snapshot. Storage space consumed by shared pages may be referred to as "shared storage space" herein.

Figure 2C:
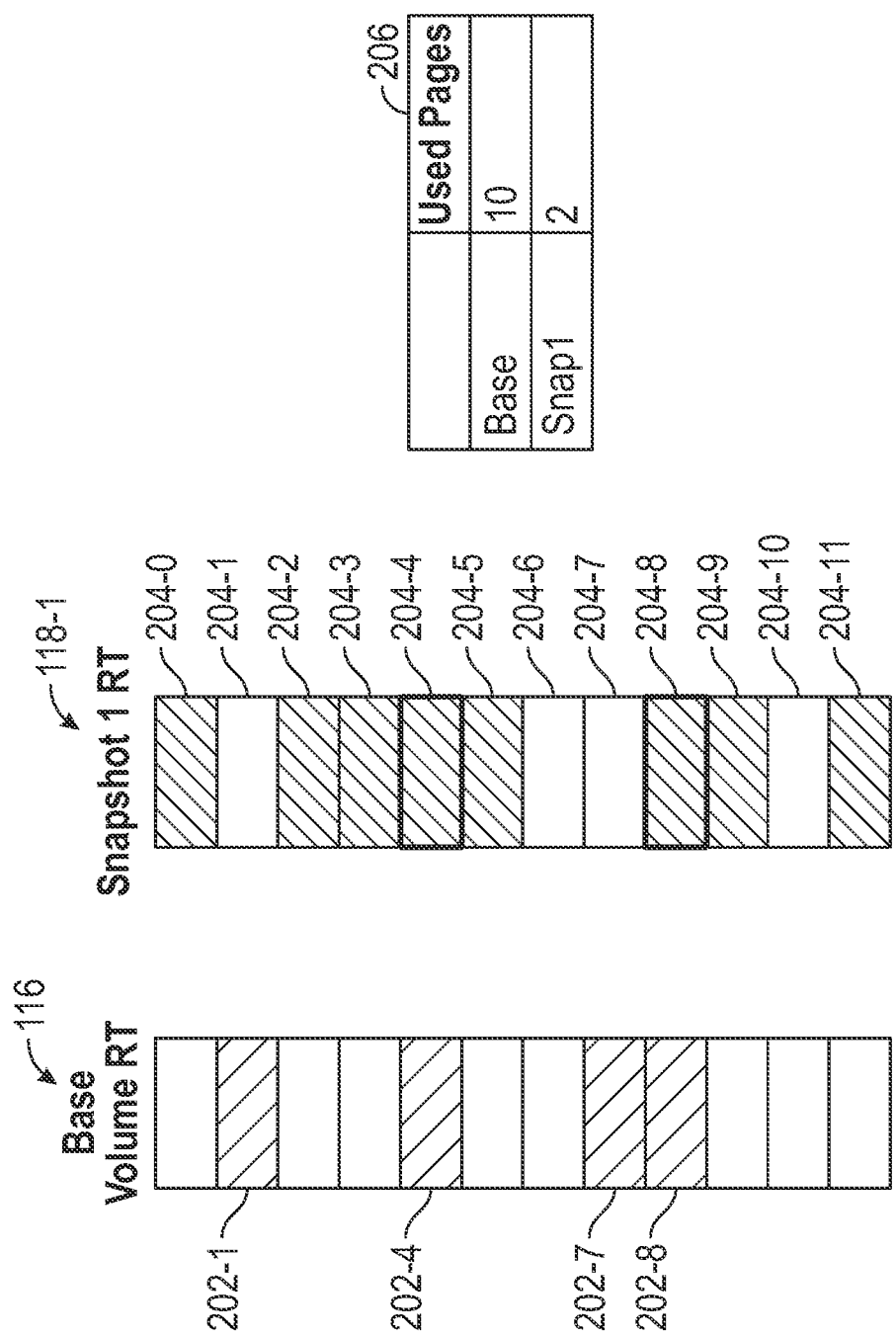

FIG. 2C depicts an example in which, after snapshot 1 is created, several writes to the base volume 108 result in base volume 108 uniquely owning new pages of data (i.e., such new pages of data are not shared with any snapshot). In the example of FIG. 2C, the reference table maintenance engine 120 adds valid references to the new pages of data to the shaded entries 202-1, 202-4, 202-7, and 202-8 of the base volume reference table 116.

The entries 202-1, 202-4, 202-7, and 202-8 of the base volume reference table 116 in FIG. 2C indicate that new pages 1, 4, 7, and 8 have been written to the base volume 108. The new pages 4 and 8 of the base volume 108 correspond to pages 4 and 8 of snapshot 1 associated with valid references in snapshot 1 reference table entries 204-4 and 204-8 in FIG. 2C. As a result of the new pages 4 and 8 written to the base volume 108, pages 4 and 8 of snapshot 1 contain data that is now unique to snapshot 1, and thus, occupy storage space that is uniquely consumed by snapshot 1. The snapshot 1 reference table entries 204-4 and 204-8 in FIG. 2C are depicted with thicker borders to indicate that these entries refer to pages of data uniquely owned by snapshot 1. In the diagrams, any reference table entry shown with thicker borders indicates that the reference table entry refers to a page of data uniquely owned by the corresponding snapshot.

In response to the writes of the four new pages (1, 4, 7, and 8) to the base volume 108, the storage space accounting engine 104 produces updated statistics 206 after each write of a new page to the base volume 108 in FIG. 2C.

The storage space accounting engine 104 can determine whether a write of a new page to the base volume 108 constitutes an overwrite as follows. When a new page is written to base volume 108, the storage space accounting engine 104 determines whether the snapshot 1 reference table 118-1 (which has been added to the memory 112) contains a valid reference in the entry for the same page in reference table 118-1. If the corresponding entry of the snapshot 1 reference table 118-1 contains a valid reference, then the write of the new page to the base volume 108 is an overwrite, which results in snapshot 1 uniquely owning the respective page of data referred to by the corresponding entry in reference table 118-1.

More generally, a rule for determining whether a new write is an overwrite (i.e., an "overwrite determination rule") may be as follows: in response to a write of a new page to a parent (e.g., a base volume or a read-write snapshot), check a corresponding entry for the same page in a reference table of a child snapshot; if that corresponding entry contains a valid reference, then the write of the new page is an overwrite.

The updates of the statistics 206 with each new write of a base volume page is as follows:

| | |
|---|---|
| Write new base volume page 1 | The storage space accounting engine 104 determines that the snapshot 1 reference table entry 204-1 contains an invalid reference for the portion of snapshot 1 corresponding to new base volume page 1. This means that the write of new base volume page 1 is not an overwrite. In response, the storage space accounting engine 104 increments the used pages count for the base volume from 8 to 9. |
| Write new base volume page 4 | The storage space accounting engine 104 determines that the snapshot 1 reference table entry 204-4 contains a valid reference for the portion of snapshot 1 corresponding to new base volume page 4. This means that the write of new base volume page 4 is an overwrite, which results in snapshot 1 uniquely owning the respective page 4 in snapshot 1. In response, the storage space accounting engine 104 increments the used pages count for the base volume from 9 to 10, followed by decrementing the used pages count for the base volume from 10 to 9, and the storage space accounting engine 104 increments the used pages count for snapshot 1 from 0 to 1 (because page 4 of snapshot 1 is now uniquely owned by snapshot 1 due to the write of new page 4 to the base volume 108). The reason that the used pages count for the base volume 108 is both incremented and decremented in this scenario is as follows. The used pages count for the base volume 108 is incremented because a write of a new page to the base volume 108 has occurred, but the used pages count for the base volume 108 is decremented because the base volume 108 no longer accounts for the storage space uniquely consumed by page 4 in snapshot 1. |

| | |
|---|---|
| | In other examples, the storage space accounting engine 104 can simply decide not to increment the used pages count for the base volume 108 (or to keep the used pages count for the base volume 108 at the same value) in response to determining that a new page written to the base volume 108 corresponds to a page in a snapshot associated with a valid reference. |
| Write new base volume page 7 | The storage space accounting engine 104 determines that snapshot 1 reference table entry 204-7 contains an invalid reference for the portion of snapshot 1 corresponding to new base volume page 7. This means that the write of new base volume page 7 is not an overwrite. In response, the storage space accounting engine 104 increments the used pages count for the base volume from 9 to 10. |
| Write new base volume page 8 | The storage space accounting engine 104 determines that snapshot 1 reference table entry 204-8 contains a valid reference for the portion of snapshot 1 corresponding to new base volume page 8. This means that the write of new base volume page 8 is an overwrite, which results in snapshot 1 uniquely owning the respective page 8 in snapshot 1. In response, the storage space accounting engine 104 increments the used pages count for the base volume from 10 to 11, followed by decrementing the used pages count for the base volume from 11 to 10, and the storage space accounting engine 104 increments the used pages count for snapshot 1 from 1 to 2 (because page 8 of snapshot 1 is now uniquely owned by snapshot 1 due to the write of new page 8 to the base volume 108). |

Whether or not a page of data of a snapshot is shared or unique can be indicated in the respective snapshot reference table entry. For example, the snapshot 1 reference table entries 204-4 and 204-8 can each include a unique indicator specifying that pages 4 and 8 in snapshot 1 are uniquely owned by snapshot 1. On the other hand, the snapshot 1 reference table entries 204-0, 204-2, 204-3, 204-5, 204-9, and 204-11 can each include a shared indicator specifying that pages 0, 2, 3, 5, 9, and 11 are shared (in this case with the base volume 108).

Figure 2D:
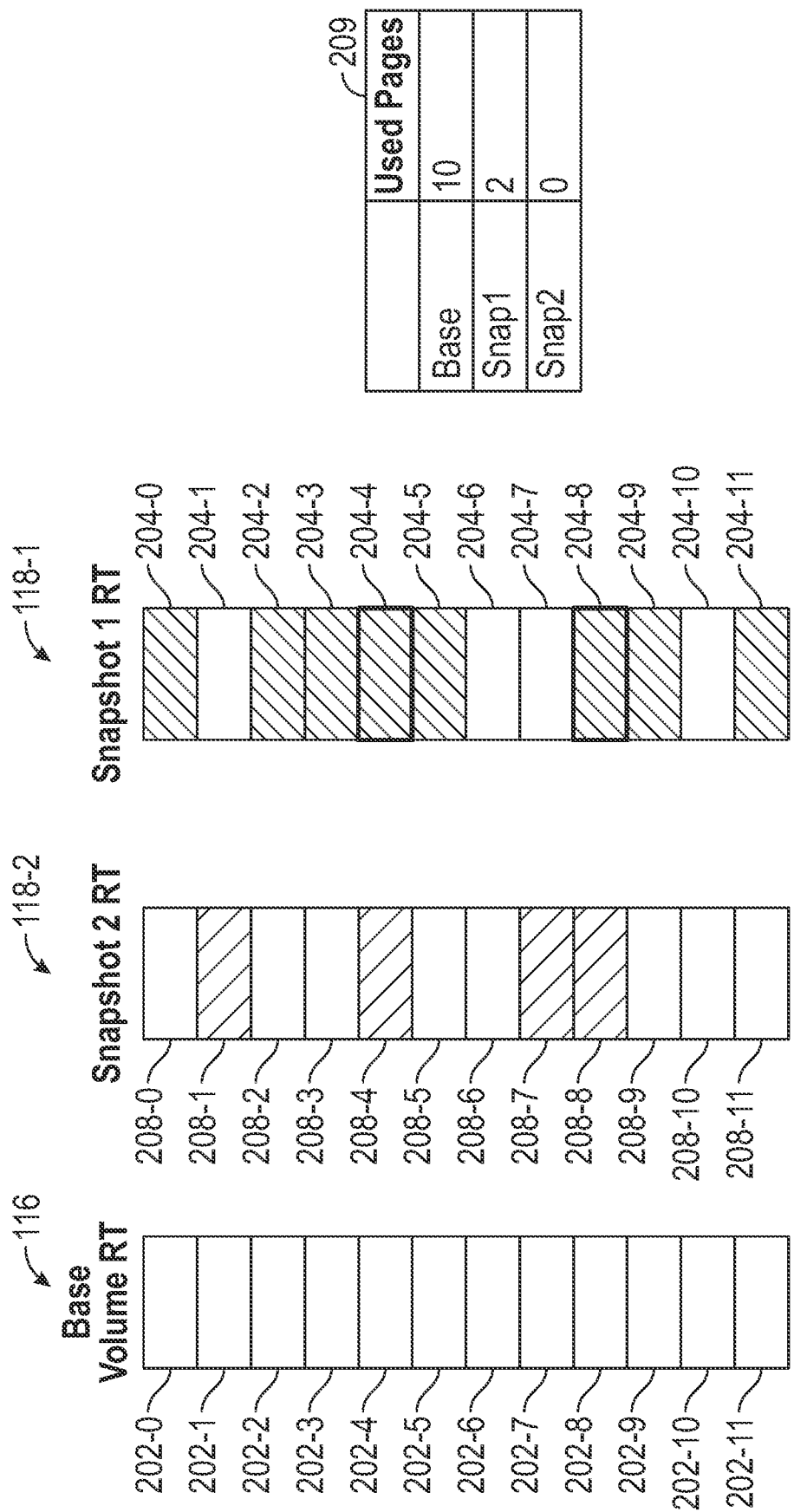
Figure 2E:
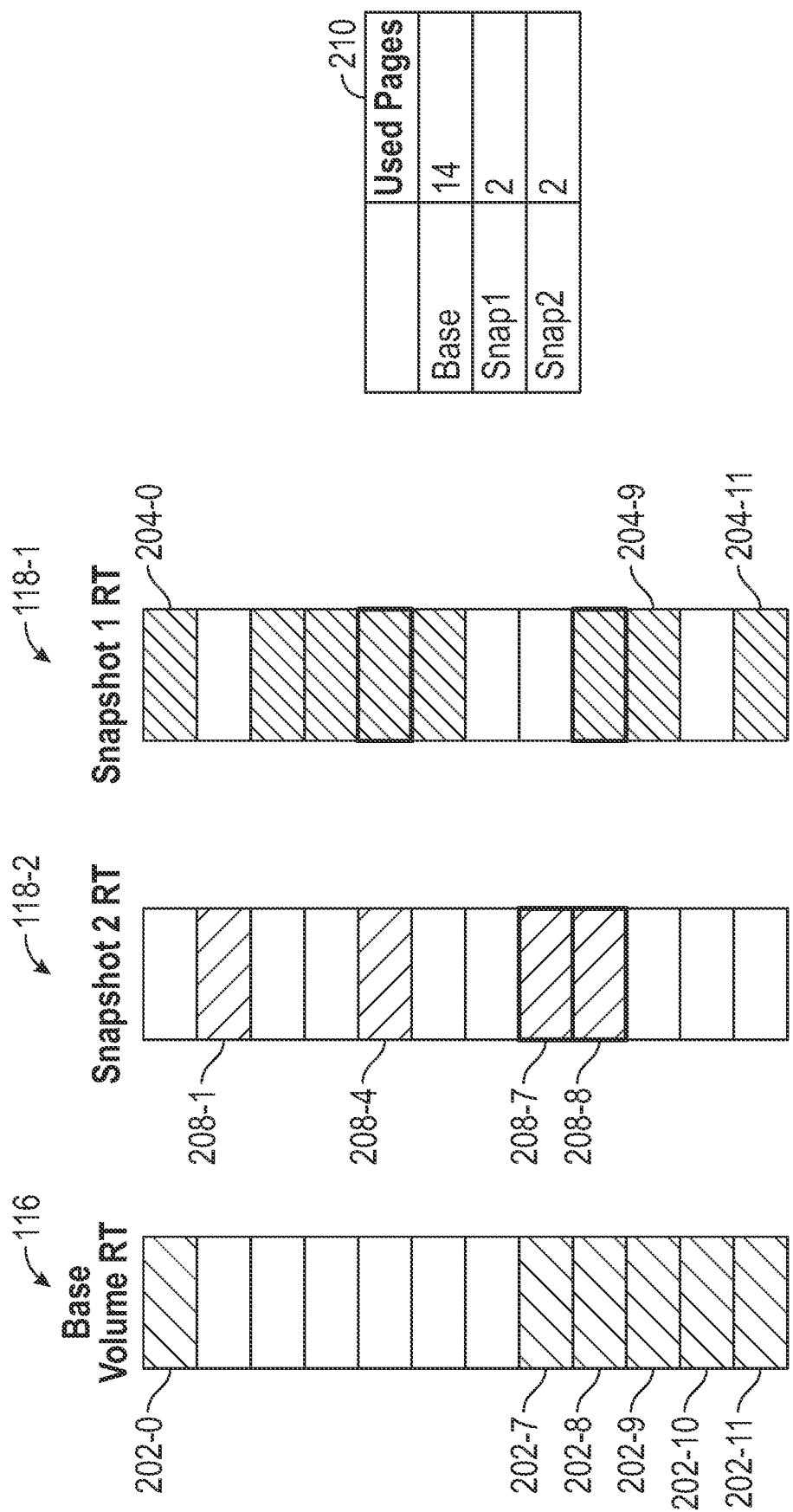

FIG. 2D illustrates an example where snapshot 2 is taken of the base volume 108 at a second point in time that is after a first point time of snapshot 1. At the time that snapshot 2 is created, the base volume 108 contains pages of data indicated by valid references in base volume reference table 116 entries 202-1, 202-4, 202-7, and 202-8 as shown in FIG. 2C. In response to the creation of snapshot 2, the reference table maintenance engine 120 creates the snapshot 2 reference table 118-2 for snapshot 1 and configures reference table 116 to again contain all invalid reference in each entry (as described above in relation to the example of FIG. 2C). The snapshot 2 reference table 118-2 includes entries 208-0 to 208-11.

The created snapshot 2 reference table 118-2 is equivalent to base volume reference table 116 shown in FIG. 2C prior to creation of snapshot 2. Snapshot 2 reference table 118-2 entries 208-1, 208-4, 208-7, and 208-8 (shaded) contain valid references, while the remaining snapshot 2 reference table entries (un-shaded) contain invalid references.

After the creation of snapshot 2, the entries of the base volume reference table 116 are invalid references (depicted as un-shaded in FIG. 2D). After the creation of snapshot 2, a lookup operation on the base volume 108 (e.g., in response to a read of the base volume 108) would find that each of the entries of the base volume reference table 116 contains an invalid reference, and in response, for each requested page, the lookup operation would access the snapshot 2 reference table 118-2 to determine whether the requested page of data is referenced by a valid reference in snapshot 2, and if not, the lookup operation would access the snapshot 1 reference table 118-1 to determine whether the requested page of data is referenced by a valid reference in snapshot 1.

FIG. 2D depicts statistics 209 associated with the base volume 108, snapshot 1, and snapshot 2 as computed by the storage space accounting engine 104. The used pages count of the base volume 108 remains at 10, the used pages count of snapshot 1 remains at 2, while the used pages count of snapshot 2 is 0.

After snapshot 2 is created, FIG. 2E depicts an example in which several writes to the base volume 108 cause writes of new pages of data (0, 7, 8, 9, 10, and 11) to the base volume 108 that are uniquely owned by the base volume 108. The new pages of data are associated with valid references added by the reference table maintenance engine 120 to the shaded entries 202-0, 202-7, 202-8, 202-9, 202-10, and 202-11 of the base volume reference table 116 in FIG. 2E.

The new pages 7 and 8 of the base volume 108 correspond to pages 7 and 8 of snapshot 2 associated with valid references in the snapshot 2 reference table entries 208-7 and 208-8 in FIG. 2E. As a result of the new pages 7 and 8 written to the base volume 108 (the writes of the new pages 7 and 8 are overwrites), pages 7 and 8 of snapshot 2 contain data that is unique to snapshot 2, and thus, occupy storage space that is uniquely consumed by snapshot 2. The snapshot 2 reference table entries 208-7 and 208-8 in FIG. 2E are depicted with thicker borders to indicate that these entries refer to pages of data uniquely owned by snapshot 2.

In response to the writes of the five new pages (0, 7, 8, 9, 10, and 11) to the base volume 108, the storage space accounting engine 104 produces updated statistics 210 after each write of a new page to the base volume 108 in FIG. 2E.

The storage space accounting engine 104 can determine whether a write of a new page to the base volume 108 constitutes an overwrite as follows. For a write of the new page to the base volume 108, the storage space accounting engine 104 accesses the snapshot 2 reference table 118-2 (which has been added to the memory 112) to determine if the respective entry of the snapshot 2 reference table 118-2 contains a valid reference. If the respective entry of the snapshot 2 reference table 118-2 contains a valid reference, then the write of the new page to the base volume 108 is an overwrite, which results in snapshot 2 uniquely owning the respective page of data in snapshot 2.

The updates of the statistics 210 with each new write of a base volume page shown in FIG. 2E is as follows:

| | |
|---|---|
| Write new base volume page 0 | The storage space accounting engine 104 determines that the snapshot 2 reference table entry 208-0 contains an invalid reference for the portion of snapshot 2 corresponding to new base volume page 0. This means that the write of new base volume page 0 is not an overwrite. In response, the storage space accounting engine 104 increments the used pages count for the base volume from 10 to 11. |
| Write new base volume page 7 | The storage space accounting engine 104 determines that the snapshot 2 reference table entry 208-7 contains a valid reference for the portion of snapshot 2 corresponding to new base volume page 7. This means that the write of new base volume page 7 is an overwrite, which results in snapshot 2 uniquely owning the respective page 7 in snapshot 1. In response, the storage space accounting engine 104 increments the used pages count for the base volume from 11 to 12, followed by decrementing the used pages count for the base volume from 12 to 11, and the storage space accounting engine 104 increments the used pages count for snapshot 2 from 0 to 1 (because page 7 of snapshot 2 is now uniquely owned by snapshot 2 due to the write of new page 7 to the base volume 108). |
| Write new base volume page 8 | The storage space accounting engine 104 determines that the snapshot 2 reference table entry 208-8 contains a valid reference for the portion of snapshot 2 corresponding to new base volume page 8. This means that the write of new base volume page 8 is an overwrite, which results in snapshot 2 uniquely owning the respective page 8 in snapshot 1. In response, the storage space accounting engine 104 increments the used pages count for the base volume from 11 to 12, followed by decrementing the used pages count for the base volume from 12 to 11, and the storage space accounting engine 104 increments the used pages count for snapshot 2 from 1 to 2 (because page 8 of snapshot 2 is now uniquely owned by snapshot 2 due to the write of new page 8 to the base volume 108). |
| Write new base volume page 9 | The storage space accounting engine 104 determines that the snapshot 2 reference table entry 208-9 contains an invalid reference for the portion of snapshot 2 corresponding to new base volume page 9. This means that the write of new base volume page 9 is not an overwrite. In response, the storage space accounting engine 104 increments the used pages count for the base volume from 11 to 12. |
| Write new base volume page 10 | The storage space accounting engine 104 determines that the snapshot 2 reference table entry 208-10 contains an invalid reference for the portion of snapshot 2 corresponding to new base volume page 10. This means that the write of new base volume page 10 is not an overwrite. In response, the storage space accounting engine 104 increments the used pages count for the base volume from 12 to 13. |
| Write new base volume page 11 | The storage space accounting engine 104 determines that the snapshot 2 reference table entry 208-11 contains an invalid reference for the portion of snapshot 2 corresponding to new base volume page 11. This means that the write of new base volume page 11 is not an overwrite. In response, the storage space accounting engine 104 increments the used pages count for the base volume from 13 to 14. |

Note that the statistic for snapshot 1 has not changed due to the writes of new pages 0 and 7-11 to the base volume 108 in FIG. 2E.

Note also that pages 0, 9, and 11 of snapshot 1 (for which valid references are contained in the snapshot 1 reference table entries 204-0, 204-9, and 204-11) are considered to be shared with the base volume 108 (and thus accounted for in the used pages count for the base volume 108) even though the base volume 108 does not refer to pages 0, 9, and 11 of snapshot 1.

Delete Snapshot Processing with Child

Figure 2F:
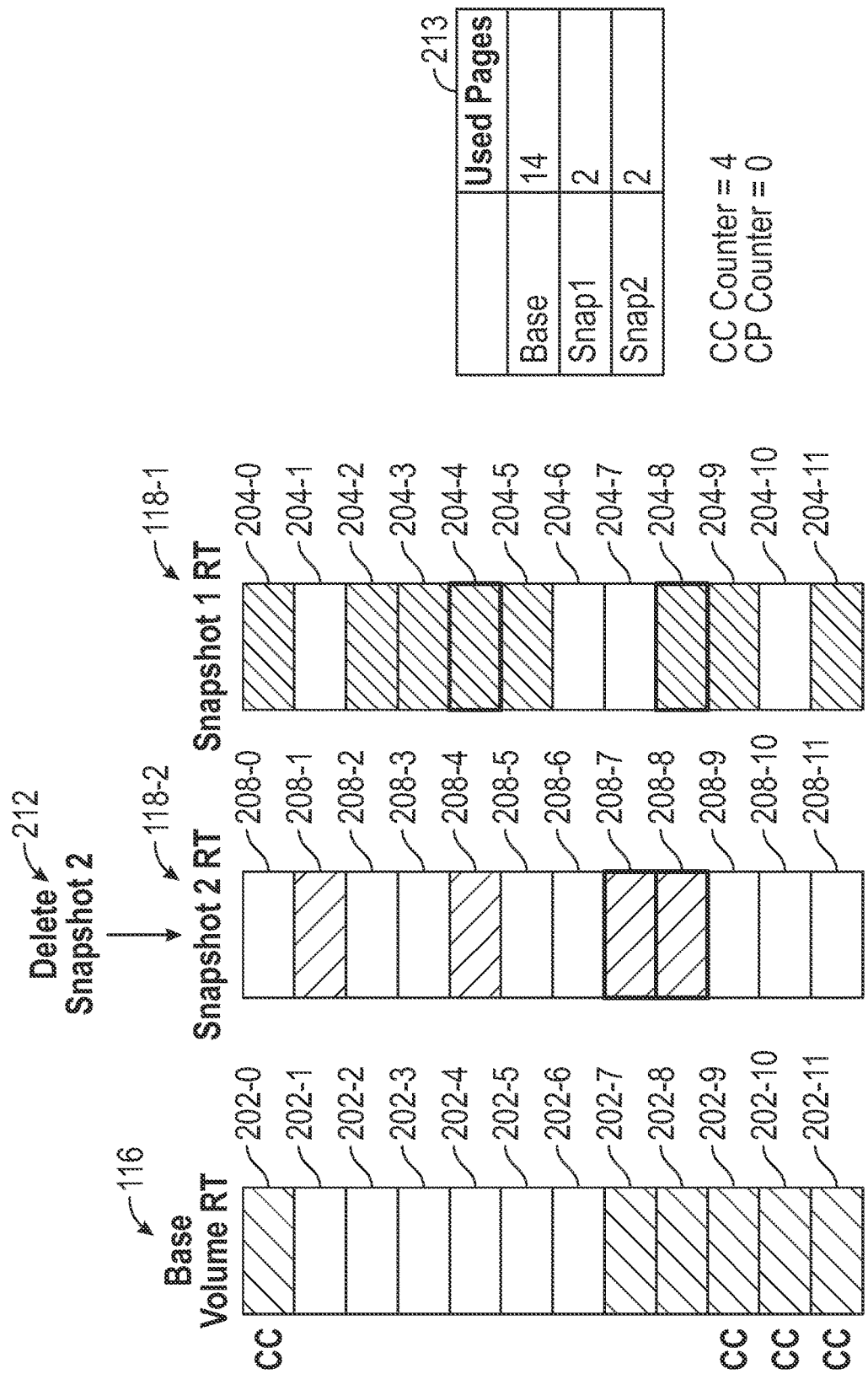

After the writes of new pages to the base volume 108 shown in FIG. 2E, FIG. 2F shows an operation to delete (at 212) snapshot 2. Note that an operation to delete a snapshot can refer to a deletion operation that has been started and is in progress, or a deletion operation that has been requested or planned. FIG. 2F depicts statistics 213 associated with the base volume 108, snapshot 1, and snapshot 2 at the time of deletion of snapshot 2 (note that the storage space accounting engine 104 has not yet performed a background process to update the statistics 213 due to the deletion of snapshot 2. Thus, the used pages count of the base volume 108 remains at 14, the used pages count of snapshot 1 remains at 2, and the used pages count of snapshot 2 remains 2.

When deleting a read-only snapshot (such as snapshot 2), the reference table entries for shared pages of the deleted snapshot (e.g., pages 1 and 4 of snapshot 2) are merged into respective entries of the parent's reference table that contain invalid references (e.g., entries 202-1 and 202-4 of the base volume 108). In such examples, reference table entries for shared pages of a deleted snapshot are not removed due to deletion of the deleted snapshot, but instead remain in the volume tree that includes the base volume and any snapshots for the base volume.

Note that the deletion of snapshot 2 may cause previously shared pages to become unique. To correctly adjust the used pages counts, up to three reference tables would have to be compared (such as in the example of FIG. 2F where a base volume 108 and the two associated snapshots 1 and 2 exist). If more snapshots were created, then a larger number of reference tables would have to be compared. It may not be practical to perform the update of the used pages counts in-line with the deletion operation to delete snapshot 2, since the deletion operation may be delayed if there are a large quantity of entries to be compared. In accordance with some implementations of the present disclosure, the storage space accounting engine 104 invokes a background process to perform the updates of the used pages counts in response to a deletion of snapshot 2. Note that the "deletion" of a snapshot can refer to removing the snapshot such that the snapshot is no longer used, or moving the snapshot from one location to another location (e.g., migrating the snapshot from one storage system to another storage system).

The storage space accounting engine 104 associates hints with reference table entries of a parent for use by the background process when updating statistics. The hints are used to indicate which other reference tables are to be checked by the background process when updating the statistics in response to the snapshot deletion. The hints can be in the form of flags or any other types of indicators.

During deletion of snapshot 2, the snapshot 2 reference table 118-2 and the reference table of the parent of snapshot 2 (which is the base volume reference table 116 in the examples discussed) are loaded into memory 112 and the entries of the snapshot 2 reference table 118-2 and the entries of the base volume reference table 116 are compared by the storage space accounting engine 104. Based on the comparison of the entries of the snapshot 2 reference table 118-2 and the entries of the base volume reference table 116, the storage space accounting engine 104 adds flags to entries of the parent's reference table (which in the example is the base volume reference table 116) if warranted to indicate additional checks are to be performed by the background process for storage space accounting.

The flags include a CHK_SHARED_CHILD flag and a CHK_SHARED_PARENT flag. A flag can be set (e.g., to a first value) to indicate that a check of a corresponding reference table entry is to be performed, and can be cleared (e.g., to a second value) to indicate that a check of a corresponding reference table entry does not have to be performed. The CHK_SHARED_CHILD flag when set indicates that an entry of a reference table of a child of the deleted snapshot is to be checked, and the CHK_SHARED_PARENT flag when set indicates that an entry of a reference table of a grandparent of the deleted snapshot is to be checked.

The storage space accounting engine 104 controls the state of the CHK_SHARED_PARENT flag and the CHK_SHARED_CHILD flag as follows. If an entry of the reference table of the deleted snapshot includes a valid reference (to a corresponding page of the deleted snapshot), then the storage space accounting engine 104 is to check the corresponding entry of the reference table of the parent of the deleted snapshot. If the respective entry of the parent's reference table is valid, the storage space occupied by the corresponding page of the deleted snapshot is being freed (since the corresponding page of the deleted snapshot is uniquely owned by the deleted snapshot), and no flag is to be set.

If a given entry of the reference table of the deleted snapshot includes an invalid reference and a corresponding entry of the reference table of the parent of the deleted snapshot includes a valid reference, then that indicates there may be shared storage space between the deleted snapshot and a child snapshot of the deleted snapshot (if a child snapshot exists). If the deleted snapshot has a child snapshot, the storage space accounting engine 104 is to set the CHK_SHARED_CHILD flag in an entry of the reference table of the parent corresponding to the given entry of the deleted snapshot.

If a given entry of the reference table of the deleted snapshot includes a valid reference, and if the corresponding entry of the parent's reference table is invalid, then the storage space accounting engine 104 is to check whether the deleted snapshot has a grandparent. If so, the storage space accounting engine 104 is to merge the given entry of the reference table of the deleted snapshot with the parent's snapshot reference table entry, and the storage space accounting engine 104 is to set a CHK_SHARED_PARENT flag in the parent's snapshot reference table entry. A check based on the CHK_SHARED_PARENT flag is performed because the storage space that was previously shared, and thus accounted for by the base volume, may now be unique to the parent of the deleted snapshot.

The storage space accounting engine 104 also maintains two counters for each base volume or parent snapshot for which the CHK_SHARED_CHILD flag and the CHK_SHARED_PARENT flag has been set. A CC counter (124 in FIG. 1) is incremented each time the CHK_SHARED_CHILD flag is set in an entry of the parent's reference table, and a CP counter (126 in FIG. 1) is incremented each time the CHK_SHARED_PARENT flag is set in an entry of the parent's reference table. The CC counter indicates how many reference table entries of a child are to be checked (remain to be resolved) for updating statistics, and the CP counter indicates how many reference entries of a parent are to be checked (remain to be resolved) for updating statistics. Note that multiple instances of the CC counter and CP counter can be associated with multiple respective base volume or parent snapshot reference tables for which the CHK_SHARED_CHILD flag and the CHK_SHARED_PARENT flag have been set.

The storage space accounting engine 104 schedules a background process to process the entries of the parent's reference table with the CHK_SHARED_CHILD flag or the CHK_PARENT_CHILD flag set. For example, the storage space accounting engine 104 can add a representation of the background process to be processed on the parent's reference table to a scheduling queue. When started, the background process loads the parent's reference table and the grandparent's or child's reference table into memory for determining statistics to update.

A background process invoked by the storage space accounting engine 104 processes any set flag as follows.

For each entry of the parent's reference table with the CHK_SHARED_CHILD flag set, the background process checks if the respective reference table entry of the deleted snapshot's child has a valid reference, which indicates that the deleted snapshot shares a corresponding page with the child snapshot. Based on the respective reference table entry of the deleted snapshot's child having a valid reference, the background process determines that the corresponding page is no longer shared, and the used pages count of the base volume (or a parent read-write snapshot) is decremented and the used pages count of the child snapshot is incremented. The CHK_SHARED_CHILD flag in the entry of the parent's reference table is cleared, and the CC counter is decremented after the foregoing processing.

For each entry of the parent's reference table with the CHK_SHARED_PARENT set, the background process checks if the page of data referred to by the entry of the parent's reference table is unique to the parent snapshot. The page of data referred to by the entry of the parent's reference table is unique to the parent snapshot if the respective grandparent reference table entry has a valid reference. The grandparent can be the base volume or a parent read-write snapshot. In that case, the used pages count of the base volume (or a parent read-write snapshot) is decremented, and the used pages count of the parent snapshot is incremented. The CHK_SHARED_PARENT flag in entry of the parent's reference table is cleared and the CP counter is decremented after the foregoing processing.

With reference to FIG. 2F, the following describes examples of how the storage space accounting engine 104 controls whether a flag (and more specifically, the CHK_SHARED_CHILD flag) is set for respective entries of a parent of deleted snapshot 2. Due to the deletion of snapshot 2, the snapshot 2 reference table 118-2 and the base volume reference table 116 (the parent of snapshot 2) are loaded into the memory 112. The storage space accounting engine 104 can determine whether deleted snapshot 2 has a child or a grandparent (based on metadata indicating the presence of snapshots of the base volume 108). However, the reference tables for any child or grandparent of deleted snapshot 2 has not been loaded into the memory 112 and thus not yet available to the storage space accounting engine 104.

| | |
|---|---|
| Snapshot 2 reference table entry 208-0 | Since the snapshot 2 reference table entry 208-0 has an invalid reference, the storage space accounting engine 104 checks the respective entry of the reference table of the parent (the base volume reference table entry 202-0 in the example). Because the base volume reference table entry 202-0 has a valid reference, there may be shared space in one or more snapshots accounted for in the base volume's statistic. In this case, the storage space accounting engine 104 checks if deleted snapshot 2 has a child, and if so, the storage space accounting engine 104 sets the CHK_SHARED_CHILD flag (indicated with "CC") in the base volume reference table entry 202-0 (the respective entry of the reference table of the parent of deleted snapshot 2). |
| Snapshot 2 reference table entry 208-1 | Since the snapshot 2 reference table entry 208-1 has a valid reference and the respective base volume reference table entry 202-1 has an invalid reference, the snapshot 2 reference table entry 208-1 is to be merged with the base volume reference table entry 202-1 (see FIG. 2G) with no storage space accounting change for this entry. |
| Snapshot 2 reference table entry 208-2 | Since the snapshot 2 reference table entry 208-2 has an invalid reference and the respective base volume reference table entry 202-2 also has an invalid reference, no storage space accounting change is to be performed for this entry. |
| Snapshot 2 reference table entry 208-3 | Since the snapshot 2 reference table entry 208-3 has an invalid reference and the respective base volume reference table entry 202-3 also has an invalid reference, no storage space accounting change is to be performed for this entry. |
| Snapshot 2 reference table entry 208-4 | Since the snapshot 2 reference table entry 208-4 has a valid reference and the respective base volume reference table entry 202-4 has an invalid reference, the snapshot 2 reference table entry 208-4 is to be merged with the base volume reference table entry 202-4 (see FIG. 2G) with no storage space accounting change for this entry. |
| Snapshot 2 reference table entry 208-5 | Since the snapshot 2 reference table entry 208-5 has an invalid reference and the respective base volume reference table entry 202-5 also has an invalid reference, no storage space accounting change is to be performed for this entry. |
| Snapshot 2 reference table entry 208-6 | Since the snapshot 2 reference table entry 208-6 has an invalid reference and the respective base volume reference table entry 202-6 also has an invalid reference, no storage space accounting change is to be performed for this entry. |
| Snapshot 2 reference table entry 208-7 | Since the snapshot 2 reference table entry 208-7 has a valid reference and the respective base volume reference table entry 202-7 also has a valid reference, the storage space occupied by the corresponding page of deleted snapshot 2 is being freed up (since the corresponding page of deleted snapshot 2 is uniquely owned by the deleted snapshot). |
| Snapshot 2 reference table entry 208-8 | Since the snapshot 2 reference table entry 208-8 has a valid reference and the respective base volume reference table entry 202-8 also has a valid reference, the storage space occupied by the corresponding page of deleted snapshot 2 is being freed up (since the corresponding page of deleted snapshot 2 is uniquely owned by the deleted snapshot). |
| Snapshot 2 reference table entry 208-9 | Since the snapshot 2 reference table entry 208-9 has an invalid reference, the storage space accounting engine 104 checks the respective entry of the reference table of the parent (the base volume reference table entry 202-9 in the example). Because the base volume reference table entry 202-9 has a valid reference, there may be shared space in one or more snapshots accounted for in the base volume's statistic. In this case, the storage space accounting engine 104 checks if deleted snapshot 2 has a child, |

| | |
|---|---|
| | and if so, the storage space accounting engine 104 sets the CHK_SHARED_CHILD flag (indicated with "CC") in the base volume reference table entry 202-9. |
| Snapshot 2 reference table entry 208-10 | Since the snapshot 2 reference table entry 208-10 has an invalid reference, the storage space accounting engine 104 checks the base volume reference table entry 202-10. Because the base volume reference table entry 202-10 has a valid reference, there may be shared space in one or more snapshots accounted for in the base volume's statistic. In this case, the storage space accounting engine 104 checks if deleted snapshot 2 has a child, and if so, the storage space accounting engine 104 sets the CHK_SHARED_CHILD flag (indicated with "CC") in the base volume reference table entry 202-10. |
| Snapshot 2 reference table entry 208-11 | Since the snapshot 2 reference table entry 208-11 has an invalid reference, the storage space accounting engine 104 checks the base volume reference table entry 202-11. Because the base volume reference table entry 202-11 has a valid reference, there may be shared space in one or more snapshots accounted for in the base volume's statistic. In this case, the storage space accounting engine 104 checks if deleted snapshot 2 has a child, and if so, the storage space accounting engine 104 sets the CHK_SHARED_CHILD flag (indicated with "CC") in the base volume reference table entry 202-11. |

As the storage space accounting engine 104 sets the CHK_SHARED_CHILD flag in each entry of the base volume reference table 116, the storage space accounting engine 104 increments the CC counter for the base volume reference table 116. Since the CHK_SHARED_CHILD flag was set in four entries of the base volume reference table 116 in FIG. 2F, the CC counter is incremented to four (CC Counter=4 as shown in FIG. 2F) to indicate the number of reference table entries of a child that are to be checked in the background process. Since the CHK_SHARED_PARENT flag was not set in any reference table entry, a CP counter representing a number of reference table entries of a grandparent that are to be checked in the background process remains at zero (also shown in FIG. 2F).

The following describes a background process that uses the CHK_SHARED_CHILD flag set in the four entries of the base volume reference table 116 in FIG. 2F. The background process has loaded the reference table of the child (snapshot 1 reference table 118-1) of deleted snapshot 2 into the memory 112.

The background process determines if shared space between snapshots has become storage space uniquely consumed by one snapshot, as a result of a different snapshot being deleted.

| | |
|---|---|
| CC in base volume reference table entry 202-0 | The background process checks snapshot 1 reference table entry 204-0 (the reference table of the child snapshot of deleted snapshot 2), which has a valid reference. This situation arises due to the snapshot 2 reference table entry 208-0 having an invalid reference and the base volume reference table entry 202-0 having a valid reference, which indicates there may be shared storage space between snapshot 2 and snapshot 1. The background process determines that there is such shared storage space in response to the snapshot 1 reference table entry 204-0 having a valid reference. This shared storage space becomes storage space uniquely consumed by snapshot 1 because of the deletion of snapshot 2. As a result, the background process increments the used pages count for snapshot 1 from 2 to 3 (to increase the storage space uniquely consumed by snapshot 1), and decrements the used pages count for the base volume 108 from 14 to 13 because the used pages count for the base volume 108 accounted for the previously shared storage space between snapshot 2 and snapshot 1. The background process also decrements the CC counter from 4 to 3. |
| CC in base volume reference table entry 202-9 | (Similar to the situation for 202-0) The background process checks the snapshot 1 reference table entry 204-9, which has a valid reference. This situation arises due to the snapshot 2 reference table entry 208-9 having an invalid reference and the base volume reference table entry 202-9 having a valid reference, which indicates there may be shared storage space between snapshot 2 and snapshot 1. The background process determines that there is such shared storage space in response to the snapshot 1 reference table entry 204-9 having a valid reference. As a result, the background process increments the used pages count for snapshot 1 from 3 to 4 (to increase the storage space uniquely consumed by snapshot 1), and decrements the used |

| | |
|---|---|
| CC in base volume reference table entry 202-10 | pages count for the base volume 108 from 13 to 12 because the used pages count for the base volume 108 accounted for the previously shared storage space between snapshot 2 and snapshot 1.<br>The background process also decrements the CC counter from 3 to 2.<br>The background process checks the snapshot 1 reference table entry 204-10, which has an invalid reference. This means there was no shared space between snapshot 2 and snapshot 1, and thus the statistics for snapshot 1 and the base volume 108 do not have to be updated for this entry.<br>The background process also decrements the CC counter from 2 to 1. |
| CC in base volume reference table entry 202-11 | (Similar to the situation for 202-0) The background process checks the snapshot 1 reference table entry 204-11, which has a valid reference. This situation arises due to the snapshot 2 reference table entry 208-11 having an invalid reference and the base volume reference table entry 202-11 having a valid reference, which indicates there may be shared storage space between snapshot 2 and snapshot 1. The background process determines that there is such shared storage space in response to the snapshot 1 reference table entry 204-11 having a valid reference. As a result, the background process increments the used pages count for snapshot 1 from 4 to 5 (to increase the storage space uniquely consumed by snapshot 1), and decrements the used pages count for the base volume 108 from 12 to 11 because the used pages count for the base volume 108 accounted for the previously shared storage space between snapshot 2 and snapshot 1.<br>The background process also decrements the CC counter from 1 to 0. |

Once the CC counter reaches zero, the background process is complete (note that the CP counter was at zero). The updated statistics for the base volume 108 and snapshot 1 are reflected in statistics 214 shown in FIG. 2G.

Delete Snapshot Processing with Grandparent and Child

Figure 3A:
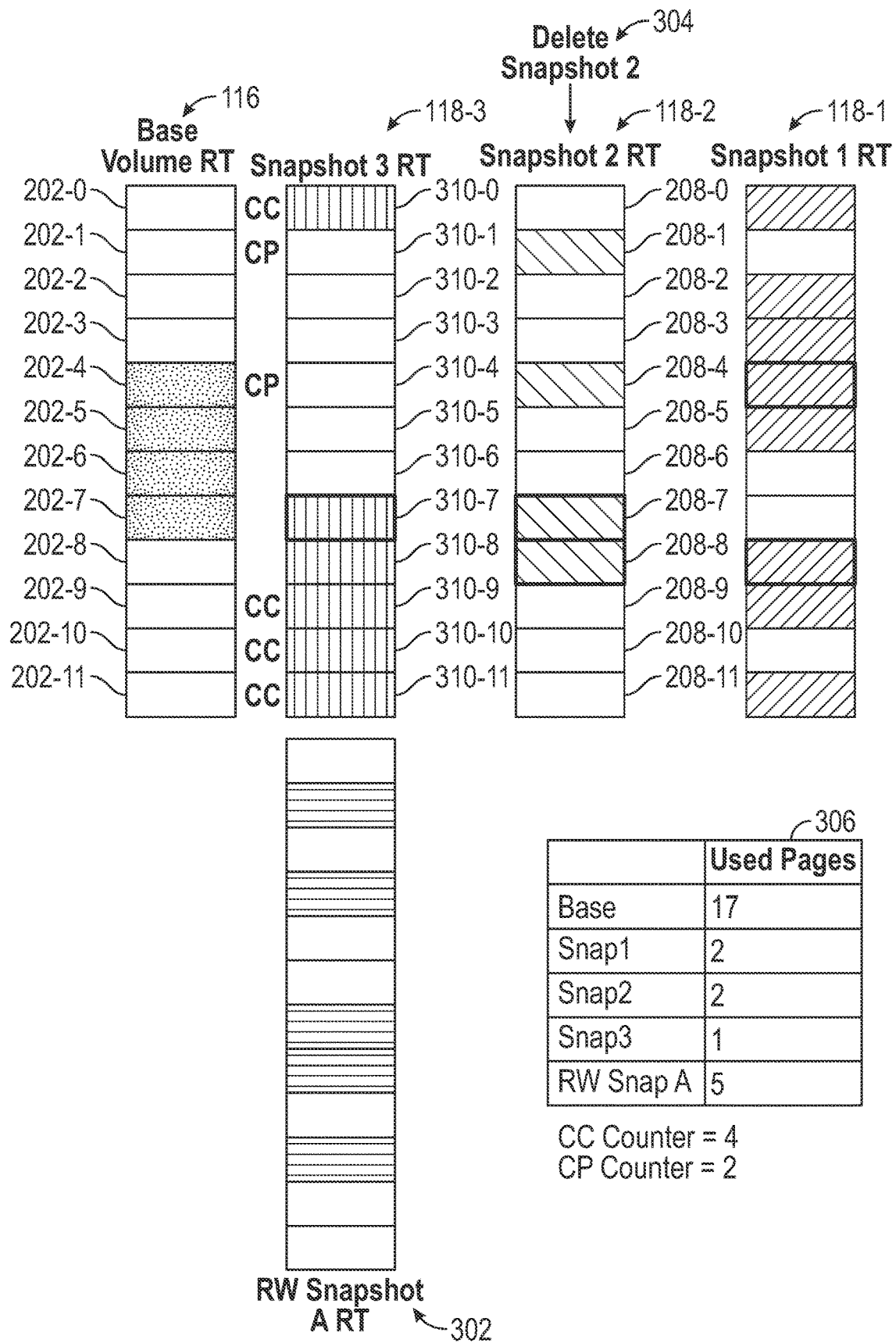

FIG. 3A shows an example where read-write (RW) snapshot A was created based on the base volume, and a corresponding read-write (RW) snapshot A reference table 302 was created for read-write snapshot A. Also, snapshot 3 is a read-only snapshot that was created based on read-write snapshot A. The snapshot 3 reference table 118-3 is associated with snapshot 3.

Starting with the state shown in FIG. 3A, it is assumed that an operation to delete (at 304) snapshot 2 is performed. Because there is an intermediate snapshot 3 between deleted snapshot 2 and the base volume 108, the base volume 108 is the grandparent of deleted snapshot 2. Statistics 306 shown in FIG. 3A include used pages counts for the base volume 108, snapshot 1, snapshot 2, snapshot 3, and RW snapshot A. In FIG. 3A, the base volume reference table 116 has entries 204-4 to 204-8 (shaded) with valid references. The remaining entries (un-shaded) of the base volume reference table 116 in FIG. 3A have invalid references.

In response to the deletion of snapshot 2, the snapshot 2 reference table 118-2 and the snapshot 3 reference table 118-3 are loaded into the memory 112. The following describes how the storage space accounting engine 104 controls whether a flag is set for respective entries of a parent of deleted snapshot 2. In the example of FIG. 3A, the parent of snapshot 2 is snapshot 3.

| | |
|---|---|
| Snapshot 2 reference table entry 208-0 | Since the snapshot 2 reference table entry 208-0 has an invalid reference, the storage space accounting engine 104 checks the respective entry of the reference table of the parent (snapshot 3 reference table entry 310-0 in the example). Because the snapshot 3 reference table entry 310-0 has a valid reference, there may be shared storage space with a child snapshot accounted for in the base volume's statistic. The shared space may become storage space uniquely consumed by the child snapshot. In this case, the storage space accounting engine 104 checks if deleted snapshot 2 has a child, and if so, the storage space accounting engine 104 sets the CHK_SHARED_CHILD flag (indicated with "CC" in FIG. 3A) in the snapshot 3 reference table entry 310-0 (the respective entry of the reference table of the parent of deleted snapshot 2). |
| Snapshot 2 reference table entry 208-1 | The snapshot 2 reference table entry 208-1 has a valid reference, and the respective entry of the reference table of the parent (the snapshot 3 reference table entry 310-1 in the example) has an invalid reference. The storage space accounting engine 104 checks if deleted snapshot 2 has a grandparent. If so, the storage space accounting engine 104 merges the snapshot 2 reference table entry 208-1 with the snapshot 3 reference table entry 310-1, and sets a CHK_SHARED_PARENT flag (indicated with "CP" in FIG. 3A) in the snapshot 3 reference table entry 310-1. The merging results in the invalid reference in the snapshot 3 |

| | -continued |
|---|---|
| | reference table entry 310-1 becoming a valid reference. The storage space accounting engine 104 will later check if the page of data referred to by the snapshot 3 reference table entry 310-1 is unique to snapshot 3. The page of data referred to by the snapshot 3 reference table entry 310-1 is unique to snapshot 3 if the respective grandparent reference table entry (the base volume reference table entry 202-1 in the example) has a valid reference. The page of data referred to by the snapshot 3 reference table entry 310-1 is not unique to snapshot 3 (i.e., it is shared) if the respective grandparent reference table entry (the base volume reference table entry 202-1 in the example) has an invalid reference. |
| Snapshot 2 reference table entries 208-2 and 208-3 | Since the snapshot 2 reference table entries 208-2 and 208-3 have invalid references, and the respective snapshot 3 reference table entries 310-2 and 310-3 also have invalid references, no storage space accounting is to be performed for these entries. |
| Snapshot 2 reference table entry 208-4 | The snapshot 2 reference table entry 208-4 has a valid reference, and the respective entry of the reference table of the parent (the snapshot 3 reference table entry 310-4 in the example) has an invalid reference. The storage space accounting engine 104 checks if deleted snapshot 2 has a grandparent. If so, the storage space accounting engine 104 merges the snapshot 2 reference table entry 208-4 with the snapshot 3 reference table entry 310-4, and sets a CHK_SHARED_PARENT flag (indicated with "CP") in the snapshot 3 reference table entry 310-4. The merging results in the invalid reference in the snapshot 3 reference table entry 310-4 becoming a valid reference. The storage space accounting engine 104 will later check if the page of data referred to by the snapshot 3 reference table entry 310-4 is unique to snapshot 3. The page of data referred to by the snapshot 3 reference table entry 310-4 is unique to snapshot 3 if the respective grandparent reference table entry (the base volume reference table entry 202-4 in the example) has a valid reference. |
| Snapshot 2 reference table entries 208-5 and 208-6 | Since the snapshot 2 reference table entries 208-5 and 208-6 have invalid references, and the respective snapshot 3 reference table entries 310-5 and 310-6 also have invalid references, no storage space accounting is to be performed for these entries. |
| Snapshot 2 reference table entries 208-7 and 208-8 | Since the snapshot 2 reference table entries 208-7 and 208-8 have valid references, and the respective snapshot 3 reference table entries 310-7 and 310-8 also have valid references, the storage space occupied by the corresponding pages of deleted snapshot 2 is being freed up (since the corresponding pages of deleted snapshot 2 are uniquely owned by deleted snapshot 2). |
| Snapshot 2 reference table entries 208-9, 208-10, and 208-11 | (Similar to snapshot 2 reference table entry 208-0). The storage space accounting engine 104 sets the CHK_SHARED_CHILD flag (indicated with "CC") in each of the snapshot 3 reference table entries 310-9, 310-10, and 310-11. |

In the example of FIG. 3A, the CHK_SHARED_CHILD flag is set in four snapshot 3 reference table entries, so the CC counter is incremented to 4. The CHK_SHARED_PARENT flag is set in two snapshot 3 reference table entries, so the CP counter is set to 2.

If the background process is invoked after the flags have been set, the updating of statistics for the reference table entries with the CHK_SHARED_CHILD flag set is similar to that discussed above in connection with FIGS. 2F and 2G.

To process the snapshot 3 reference table entry 310-1 set with the CHK_SHARED_PARENT flag, the background process checks if the page of data referred to by the snapshot 3 reference table entry 310-1 is unique to snapshot 3. The page of data referred to by the snapshot 3 reference table entry 310-1 is unique to snapshot 3 if the respective grandparent reference table entry (the base volume reference table entry 202-1 in the example) has a valid reference. In the example of FIG. 3A, the background process determines that the page of data referred to by the snapshot 3 reference table entry 310-1 is not unique to snapshot 3 (i.e., it is shared), because the respective base volume reference table entry 202-1 has an invalid reference. Therefore, the background process does not update the statistics. After this determination, the background process decrements the CP counter from 2 to 1.

To process the snapshot 3 reference table entry 310-4 set with the CHK_SHARED_PARENT flag, the background process checks if the page of data referred to by the snapshot 3 reference table entry 310-4 is unique to snapshot 3. The page of data referred to by the snapshot 3 reference table entry 310-4 is unique to snapshot 3 if the respective grandparent reference table entry (the base volume reference table entry 202-4 in the example) has a valid reference. In the example of FIG. 3A, the background process determines that the page of data referred to by the snapshot 3 reference table entry 310-4 is unique to snapshot 3 (i.e., it is not shared), because the respective base volume reference table entry 202-4 has a valid reference. Therefore, the background process decrements the used pages count of the base volume 108 (the grandparent of deleted snapshot 2), and increments the used pages count of snapshot 3 (the parent of deleted snapshot 2). After this determination, the background process decrements the CP counter from 1 to 0, which indicates that all parent reference table entries with the CHK_SHARED_PARENT flag set have been processed.

Special Handling

There are various scenarios that may trigger special handling by the storage space accounting engine 104 in which space accounting can be performed as operations are on-going with snapshots, so that the amount of work to be performed by a background process can be reduced.

Scenario 1. If an I/O operation occurs to a page of a parent snapshot or base volume associated with a reference table entry that has the CHK_SHARED_CHILD flag set, the storage space accounting engine 104 can check the entry of the child's reference table and adjust statistics based on that entry of the child's reference table. Based on this processing, the storage space accounting engine 104 can clear the CHK_SHARED_CHILD flag in the reference table entry, and decrement the CC counter.

Scenario 2. When merging reference table entries of two reference tables during snapshot deletion, if the parent's reference table entry already has the CHK_SHARED_CHILD set, and the deleted snapshot's respective reference table entry has a valid reference, then the used pages count of the base volume (or another parent read-write volume) can be decremented. Note that because the used pages count of the base volume (or another parent read-write volume) is updated during snapshot deletion, the used pages count of a child snapshot does not have to be updated (as was the case in FIG. 2G when the updating is performed by the background process). Based on this processing, the storage space accounting engine 104 can clear the CHK_SHARED_CHILD flag, and decrement the CC counter.

Scenario 3: When merging reference table entries of two reference tables during snapshot deletion, if the deleted snapshot's reference table entry already has the CHK_SHARED_PARENT flag set, and the reference table entry of the deleted snapshot and the reference table entry of the parent of the deleted snapshot both include a valid reference, the storage space accounting engine 104 decrements the used pages count for the grandparent base volume (or read-write snapshot).

Scenario 2 Special Handling Example

Figure 2G:
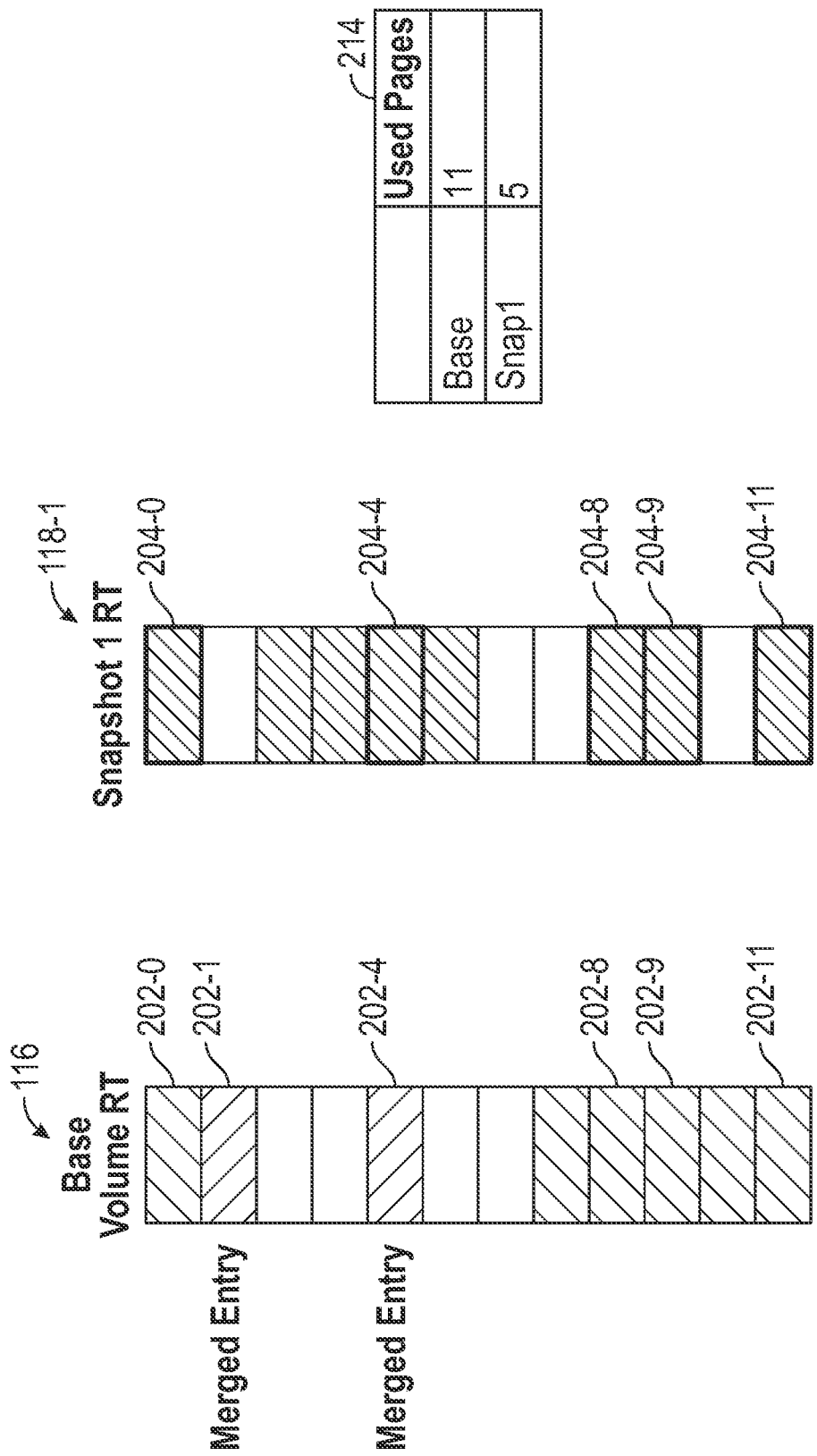

FIGS. 2F and 2G refer to an example where the background process to update statistics is initiated by the storage space accounting engine 104 after the CHK_CHILD_PARENT flag has been set in the corresponding entries of the base volume reference table 116. In a different example, both snapshot 2 and snapshot 1 may be deleted before the background process starts.

FIG. 4A shows the state of the base volume reference table 116 and snapshot 1 reference table 118-1 after the deletion of snapshot 2. Note that because the background process has not yet been invoked by the storage space accounting engine 104, statistics 404 shown in FIG. 4A for the base volume and snapshot 1 have not been updated (they are the same as depicted in the statistics 213 in FIG. 2F for the base volume and snapshot 1). Note that the statistics 404 no longer include the used pages count for snapshot 2, which has been deleted.

Before the background process is invoked, an operation to delete (at 402) snapshot 1 is performed. For the deletion operation of snapshot 1, the base volume reference table 116 and the snapshot 1 reference table 118-1 are loaded into the memory 112. Note that at this point, the base volume 108 and snapshot 1 make up the entire volume tree for the base volume 108.

The following refers to tasks of the deletion operation to delete snapshot 1.

| | |
|---|---|
| Snapshot 1 reference table entry 204-0 | Processing of this entry involves special handling scenario 2 noted above. Because the snapshot 1 reference table entry 204-0 has a valid reference, the storage space accounting engine 104 checks the respective base volume reference table entry 202-0 (the respective entry of the reference table of the parent). The storage space accounting engine 104 determines that the base volume reference table entry 202-0 has a valid reference and has the CHK_SHARED_CHILD flag set, which is an indication to check the child snapshot 1 of snapshot 2 previously deleted. Because the reference table entry of snapshot 1 is available (loaded into the memory 112), the storage space accounting engine 104 is able to resolve the CHK_SHARED_CHILD flag before having to run the background process. The storage space accounting engine 104 decrements the used pages count for the base volume 108 from 14 to 13 because the used pages count for the base volume 108 accounted for shared space between snapshots 1 and 2. After updating the statistic for the base volume 108, the CHK_SHARED_CHILD flag is cleared in the base volume reference table entry 202-0. The CC counter is also decremented from 4 to 3. |
| Snapshot 1 reference table entry 204-1 | Because the snapshot 1 reference table entry 204-1 has an invalid reference, the storage space accounting engine 104 checks the respective parent's reference table entry (e.g., the base volume reference table entry 202-1). Because the base volume reference table entry 202-1 has a valid reference, the storage space accounting engine 104 checks if snapshot 1 has a child. Since snapshot 1 does not have a child, the base volume 108 does not share page 1 of the base volume 108 with any snapshot, no space storage accounting change is made. |
| Snapshot 1 reference table entry 204-2 | The snapshot 1 reference table entry 204-2 has a valid reference, but the base volume reference entry 202-2 has an invalid reference. In response, the storage space accounting engine 104 checks if a grandparent of snapshot 1 exists. Since a grandparent of snapshot 1 does not exist in the state shown in FIG. 4A, the reference table maintenance engine 120 merges the snapshot 1 reference table entry 204-2 with the base volume reference entry 202-2, as indicated in FIG. 4B. No storage space accounting changes are performed. |

-continued

| | |
|---|---|
| Snapshot 1 reference table entry 204-3 | (Similar to snapshot 1 reference table entry 204-2) The reference table maintenance engine 120 merges the snapshot 1 reference table entry 204-3 with the base volume reference entry 202-3, as indicated in FIG. 4B. No storage space accounting changes are performed. |
| Snapshot 1 reference table entry 204-4 | Because the snapshot 1 reference table entry 204-4 has a valid reference, the storage space accounting engine 104 checks the respective base volume reference table entry 202-4. The storage space accounting engine 104 determines that the base volume reference table entry 202-4 has a valid reference, but unlike the case for snapshot 1 reference table entry 204-0, the base volume reference table entry 202-4 does not have the CHK_SHARED_CHILD flag set. In fact, the snapshot 1 reference table entry 204-4 refers to a page of data uniquely owned by snapshot 1, so deletion of snapshot 1 means that the storage space occupied by this page of data can be freed. No storage space accounting changes are performed. |
| Snapshot 1 reference table entry 204-5 | (Similar to snapshot 1 reference table entry 204-2) The reference table maintenance engine 120 merges the snapshot 1 reference table entry 204-5 with the base volume reference entry 202-5, as indicated in FIG. 4B. No storage space accounting changes are performed. |
| Snapshot 1 reference table entry 204-6 | Because both the snapshot 1 reference table entry 204-6 has an invalid reference and the respective base volume reference table entry 202-6 has an invalid reference, no storage space accounting changes are performed. |
| Snapshot 1 reference table entry 204-7 | (Similar to snapshot 1 reference table entry 204-1) Because the snapshot 1 reference table entry 204-7 has an invalid reference, the storage space accounting engine 104 checks the respective parent's reference table entry (e.g., the base volume reference table entry 202-7). Because the base volume reference table entry 202-7 has a valid reference, the storage space accounting engine 104 checks if snapshot 1 has a child. Since snapshot 1 does not have a child, the base volume 108 does not share page 7 of the base volume 108 with any snapshot, no space storage accounting change is made. |
| Snapshot 1 reference table entry 204-8 | (Similar to snapshot 1 reference table entry 204-4) Because the snapshot 1 reference table entry 204-8 has a valid reference, the storage space accounting engine 104 checks the respective base volume reference table entry 202-8. The storage space accounting engine 104 determines that the base volume reference table entry 202-8 has a valid reference, but unlike the case for snapshot 1 reference table entry 204-0, the base volume reference table entry 202-8 does not have the CHK_SHARED_CHILD flag set. In fact, the snapshot 1 reference table entry 204-8 refers to a page of data uniquely owned by snapshot 1, so deletion of snapshot 1 means that the storage space occupied by this page of data can be freed. No storage space accounting changes are performed. |
| Snapshot 1 reference table entry 204-9 | (Similar to snapshot 1 reference table entry 204-0) Processing of this entry involves special handling scenario 2 noted above. The storage space accounting engine 104 is able to resolve the CHK_SHARED_CHILD flag before having to run the background process. The storage space accounting engine 104 decrements the used pages count for the base volume 108 from 13 to 12 because the used pages count for the base volume 108 accounted for shared space between snapshots 1 and 2. After updating the statistic for the base volume 108, the CHK_SHARED_CHILD flag is cleared in the base volume reference table entry 202-9. The CC counter is also decremented from 3 to 2. |
| Snapshot 1 reference table entry 204-10 | The snapshot 1 reference table entry 204-10 has an invalid reference, and the base volume reference table entry 202-10 has a valid reference and the CHK_SHARED_CHILD flag is set. The storage space accounting engine 104 clears the CHK_SHARED_CHILD flag in the base volume reference table entry 202-10 because the invalid reference of the snapshot 1 reference table entry 204-10 indicates no shared storage space. The CC counter is also decremented from 2 to 1. |

| | -continued |
|---|---|
| Snapshot 1 reference table entry 204-11 | (Similar to snapshot 1 reference table entry 204-0) Processing of this entry involves special handling scenario 2 noted above. The storage space accounting engine 104 is able to resolve the CHK_SHARED_CHILD flag before having to run the background process. The storage space accounting engine 104 decrements the used pages count for the base volume 108 from 12 to 11 because the used pages count for the base volume 108 accounted for shared space between snapshots 1 and 2. After updating the statistic for the base volume 108, the CHK_SHARED_CHILD flag is cleared in the base volume reference table entry 202-11. The CC counter is also decremented from 1 to 0. |

FIG. 4B shows statistics 406 including the used pages count for the base volume 108 set to 11. Since all instances of the CHK_SHARED_CHILD flag have been cleared in the base volume reference table 116 (indicated by the CC counter being decremented to zero), a background process is not invoked by the storage space accounting engine 104.

Scenario 1 Special Handling Example

Figure 5A:
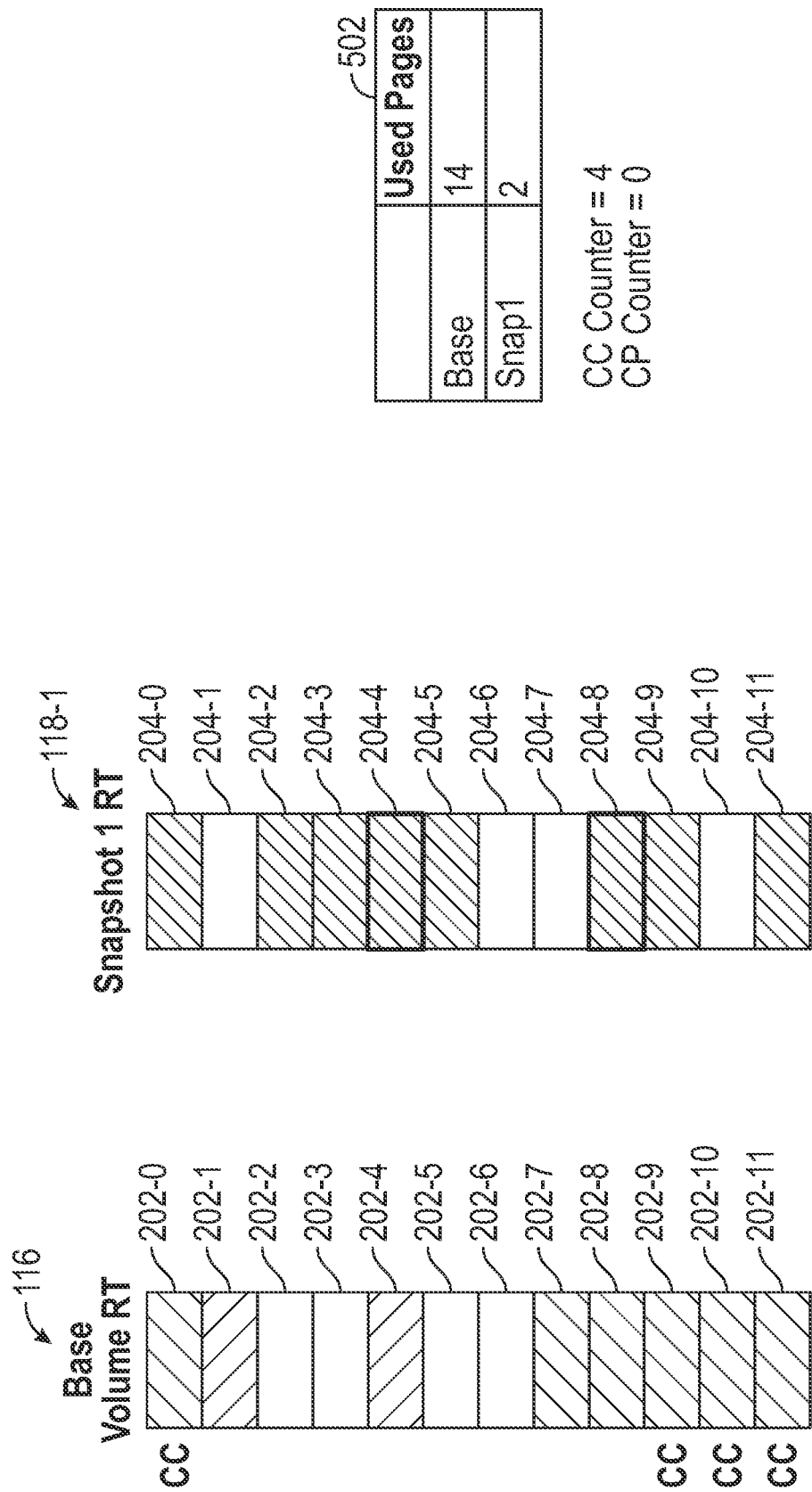

FIG. 5A shows the state of the base volume reference table 116 and snapshot 1 reference table 118-1 after the deletion of snapshot 2. Note that because the background process has not yet been invoked by the storage space accounting engine 104, statistics 502 shown in FIG. 5A for the base volume and snapshot 1 have not been updated (they are the same as depicted in the statistics 213 in FIG. 2F for the base volume and snapshot 1). Note that the statistics 502 no longer include the used pages count for snapshot 2, which has been deleted.

The statistics 502 include a used pages count of 14 for the base volume 108, and a used pages count of 2 for snapshot 1. The used pages count of 2 for snapshot 1 is based on the fact that pages 4 and 8 of snapshot 1 contain data that is unique to snapshot 1 (as explained further above). The snapshot 1 reference table entries 204-4 and 204-8 in FIG. 5A are depicted with thicker borders to indicate that these entries refer to pages of data uniquely owned by snapshot 1.

Figure 5B:
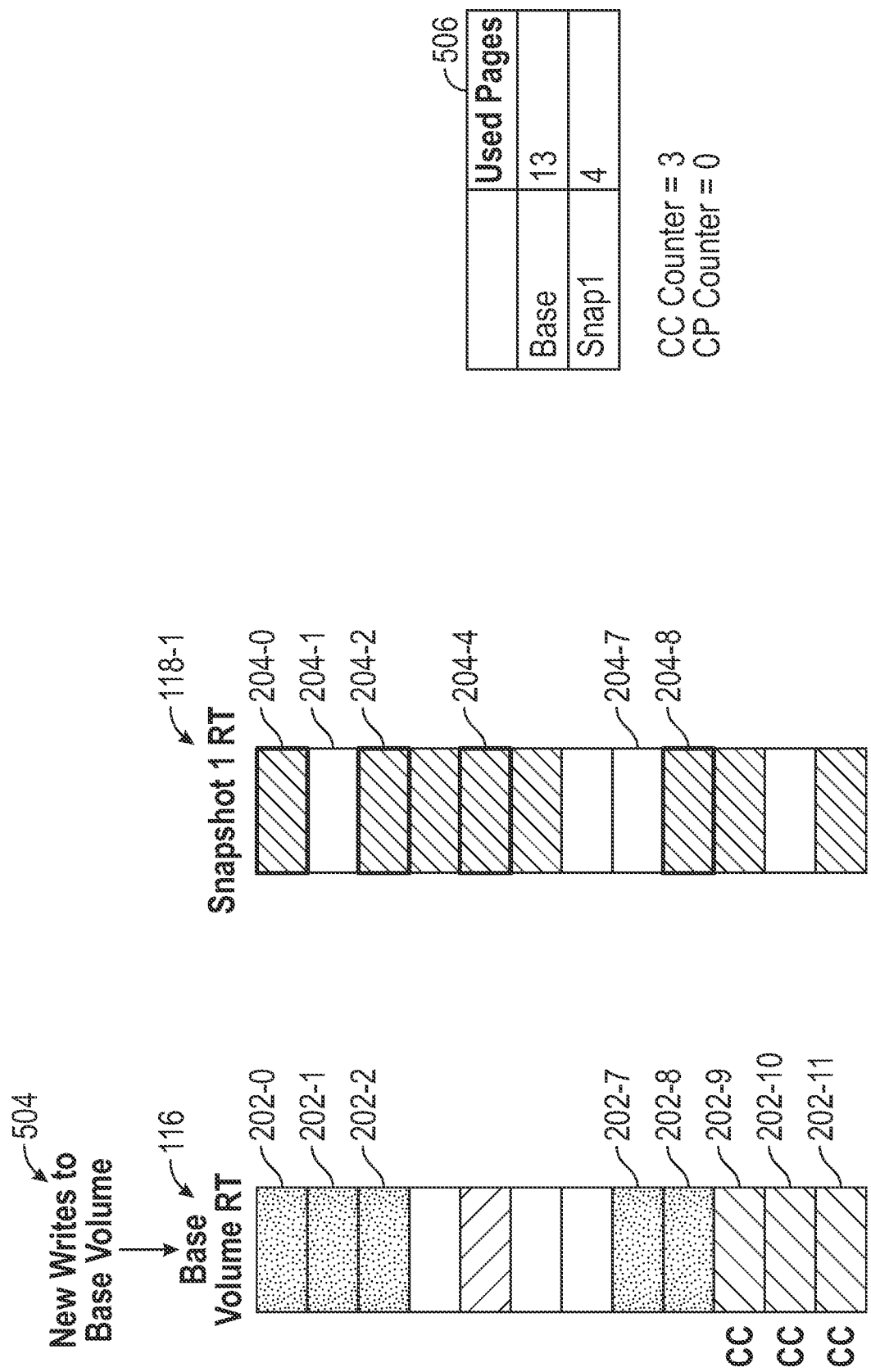

Before the background process is invoked, new writes (504) to the base volume 108 are performed, as shown in FIG. 5B. The new writes (504) are to write new base volume pages 0, 1, 2, 7, and 8, which are referred to by base volume reference table entries 202-0, 202-1, 202-2, 202-7, and 208-8 with the modified shade pattern as shown in FIG. 5B.

Processing the base volume reference table entry 202-0 in response to the write of new base volume page 0 involves special handling scenario 1 noted above. The processing of the base volume reference table entry 202-0 in response to the write of new base volume page 0 can also handle the CHK_SHARED_CHILD flag that was set in the base volume reference table entry 202-0 (indicated with "CC") in FIG. 5A.

Because new base volume page 0 corresponds to the base volume reference table entry 202-0 that already has a valid reference (see shaded rectangle representing 202-0 in FIG. 5A), the storage space accounting engine 104 does not have to check the respective snapshot 1 reference table entry 204-1. The storage space accounting engine 104 checks if the CHK_SHARED_CHILD flag is set in the base volume reference table entry 202-0 that refers to new base volume page 0 being written. Because the CHK_SHARED_CHILD flag is set in the base volume reference table entry 202-0, the storage space accounting engine 104 increments the used pages count for snapshot 1 from 2 to 3, and decrements the used pages count for the base volume 108 from 14 to 13. Incrementing the used pages count for snapshot 1 from 2 to 3 is due to page 0 of snapshot 1 now being unique to snapshot 1 because of the overwrite of new base volume page 0 to the base volume 108. The snapshot 1 reference table entry 204-0 in FIG. 5B is depicted with a thicker border to indicate that this entry refers to a page of data uniquely owned by snapshot 1.

Because the CHK_SHARED_CHILD flag in the base volume reference table entry 202-0 has been handled with the write of new base volume page 0, the storage space accounting engine 104 clears the CHK_SHARED_CHILD flag in the base volume reference table entry 202-0, and decrements the CC counter from 4 to 3.

At this point, the statistics have been updated in response to the write of new base volume page 0, before the background process (scheduled due to deletion of snapshot 2) is run.

Continuing with the next write (the write of new base volume page 1 to the base volume 108), the storage space accounting engine 104 determines that the snapshot 1 reference table entry 204-1 contains an invalid reference for the portion of snapshot 1 corresponding to new base volume page 1. This means that the write of new base volume page 1 is not an overwrite. As a result, the used pages count for snapshot 1 is not updated. Moreover, because new base volume page 1 corresponds to the base volume reference table entry 202-1 that already has a valid reference, the used pages count for the base volume 108 is not incremented.

Continuing with the next write (the write of new base volume page 2 to the base volume 108), the storage space accounting engine 104 determines that the respective snapshot 1 reference table entry 204-2 contains a valid reference for the portion of snapshot 1 corresponding to new base volume page 2. This means that the write of new base volume page 2 is an overwrite, which results in snapshot 1 uniquely owning the respective page 3 in snapshot 1 (indicated by the thicker border of the snapshot 1 reference table entry 204-2). In response, the storage space accounting engine 104 increments the used pages count for snapshot 1 from 3 to 4 (because page 2 of snapshot 1 is now uniquely owned by snapshot 1 due to the write of new base volume page 2 to the base volume 108). Because new base volume page 1 corresponds to the base volume reference table entry 202-1 that already has a valid reference, the used pages count for the base volume 108 is not incremented.

Continuing with the next write (the write of new base volume page 7 to the base volume 108), the storage space accounting engine 104 determines that the snapshot 1 reference table entry 204-7 contains an invalid reference for the portion of snapshot 1 corresponding to new base volume page 7. This means that the write of new base volume page 7 is not an overwrite. As a result, the used pages count for snapshot 1 is not updated. Moreover, because new base volume page 7 corresponds to the base volume reference table entry 202-7 that already has a valid reference, the used pages count for the base volume 108 is not incremented.

Continuing with the next write (the write of new base volume page 8 to the base volume 108), the storage space accounting engine 104 determines that the respective snapshot 1 reference table entry 204-8 contains a valid reference for the portion of snapshot 1 corresponding to new base volume page 8. This means that the write of new base volume page 8 is an overwrite. However, page 8 of snapshot 1 is already uniquely owned by snapshot 1 (as indicated by the thicker border of the snapshot 1 reference table entry 204-8 in FIGS. 5A and 5B). As a result, the storage space accounting engine 104 does not increment the used pages count for snapshot 1. Also, because new base volume page 8 corresponds to the base volume reference table entry 202-8 that already has a valid reference, the used pages count for the base volume 108 is not incremented.

Statistics 506 in FIG. 5B updated by the storage space accounting engine 104 after the writes of new pages 0, 1, 2, 7, and 8 include a used pages count of 13 of the base volume 108 and a used pages count of 4 for snapshot 1. The CHK_SHARED_CHILD flag set in base volume reference table entries 202-9, 202-10, and 202-11 are unchanged since no writes occurred to pages corresponding to those entries.

Scenarios 2 & 3 Special Handling Example

In the discussion accompanying FIG. 3A above, the background process was invoked after the CHK_SHARED_CHILD flag and the CHK_SHARED_PARENT flag were set in various snapshot 3 reference table entries.

In a different example, before the background process is started, snapshot 1 may be deleted. The following describes tasks performed in response to the deletion of snapshot 1 and after the deletion of snapshot 2 for snapshot 3 reference table entry 310-0 (with the CHK_SHARED_CHILD flag set) and snapshot 3 reference table entries 310-1 and 310-4 (with the CHK_SHARED_PARENT flag set).

Figure 3B:
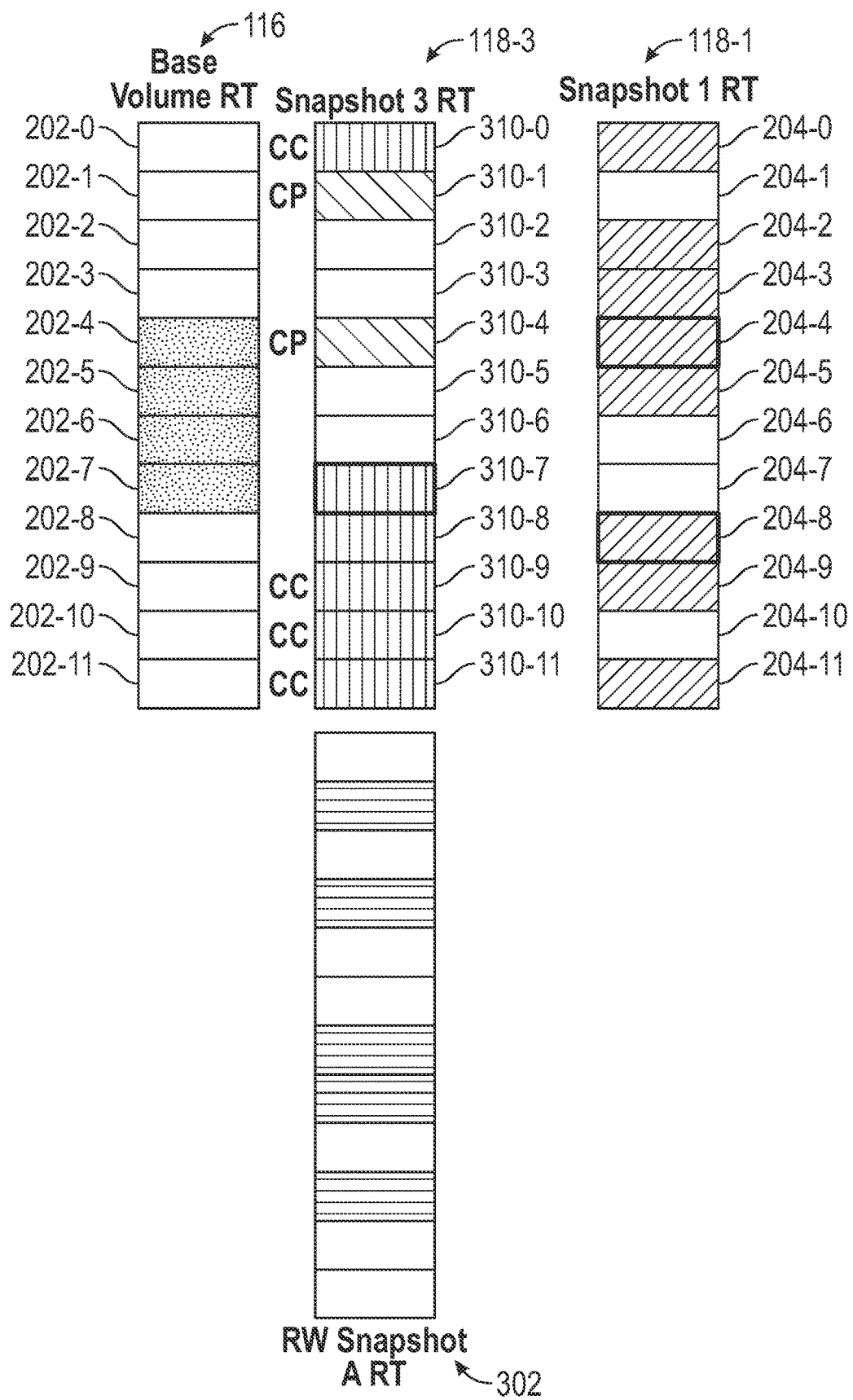

Processing of snapshot 1 reference table entry 204-0 in response to the deletion of snapshot 1 involves special handling scenario 2 noted above. Because the snapshot 1 reference table entry 204-0 has a valid reference, as shown in FIG. 3B, the storage space accounting engine 104 checks the respective snapshot 3 reference table entry 310-0 (the respective entry of the reference table of the parent). The storage space accounting engine 104 determines that the snapshot 3 reference table entry 310-0 has a valid reference and has the CHK_SHARED_CHILD flag set, which is an indication to check the child snapshot 1 of snapshot 2 previously deleted. Because the reference table entry of snapshot 1 is available (loaded into the memory 112), the storage space accounting engine 104 is able to resolve the CHK_SHARED_CHILD flag before having to run the background process. The storage space accounting engine 104 decrements the used pages count for the base volume 108 because the used pages count for the base volume 108 accounted for shared space between snapshots 1 and 2. After updating the statistic for the base volume 108, the CHK_SHARED_CHILD flag is cleared in the snapshot 3 reference table entry 310-0. The CC counter is also decremented.

Processing of snapshot 1 reference table entry 204-1 in response to the deletion of snapshot 1 is performed as follows. Because the snapshot 1 reference table entry 204-1 has an invalid reference, as shown in FIG. 3B, the storage space accounting engine 104 checks the snapshot 3 reference table entry 310-1 (snapshot 3 is the parent of snapshot 1). Because the snapshot 3 reference table entry 310-1 includes a valid reference, the storage space accounting engine 104 checks if snapshot 1 has a child. Because snapshot 1 does not have a child, this means there is no shared data and no storage space accounting changes are performed. The CHK_SHARED_PARENT flag in the snapshot 3 reference table entry 310-1 is unchanged (i.e., remains set) and the CP counter is not decremented.

The snapshot 1 reference table entry 204-4 includes a valid reference, and the snapshot 3 reference table entry 310-4 also includes a valid reference; as a result, the corresponding storage space is freed because the storage space was uniquely owned by snapshot 1. The CHK_SHARED_PARENT flag of the snapshot 3 reference table entry 310-4 remains set (and the CP counter is not decremented) since the snapshot 1 reference table entry 204-4 was not merged with the parent's snapshot reference table entry.

Referring to FIG. 3B, in a different example, before the background process is started in response to the deletion of snapshot 2, snapshot 3 (and possibly snapshot 1 as well) may be deleted. Special handling scenario 3 is involved in this example. For example, if the deleted snapshot's reference table entry (e.g., the snapshot 3 reference table entry 310-4) already has the CHK_SHARED_PARENT flag set, and the reference table entry (310-4) of the deleted snapshot 3 and the corresponding reference table entry 202-4 of the parent (base volume 108) of the deleted snapshot both include a valid reference (special handling scenario 3), the storage space accounting engine 104 decrements the used pages count for the base volume 108 because the used pages for the base volume 108 accounted for shared space between snapshots 3 and 2, before the snapshots were both deleted. The CHK_SHARED_PARENT flag is not cleared and snapshot 3's CP counter is also unchanged since this snapshot 3 reference table entry 310-4 is being deleted anyway.

For the snapshot 3 reference table entry 310-1, because the CHK_SHARED_PARENT flag is set, the storage space accounting engine 104 checks the parent (base volume 108) of snapshot 3 and the corresponding base volume reference table entry 202-1 and see if the base volume reference table entry 202-1 has an invalid reference. The CHK_SHARED_PARENT flag of the snapshot 3 reference table entry 310-1 is cleared before the snapshot 3 reference table entry 310-1 is merged with the base volume reference table entry 202-1. Snapshot 3's CP counter does not change, as snapshot 3 is deleted.

Further Examples

Figure 6:
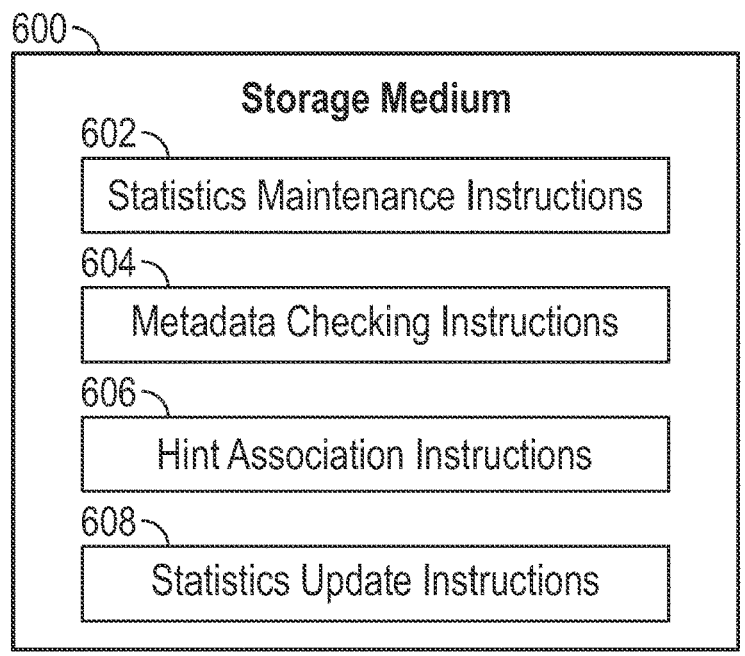
FIG. 6 is a block diagram of a storage medium storing machine-readable instructions according to some examples.

FIG. 6 is a block diagram of a non-transitory machine-readable or computer-readable storage medium storing machine-readable instructions that upon execution cause a system to perform various tasks. The system can include a computer or multiple computers. The machine-readable instructions can be part of the storage space accounting engine 104 and possibly part of the reference table maintenance engine 120 of FIG. 1, in some examples.

The machine-readable instructions include statistics maintenance instructions 602 to maintain, for a base storage structure and a collection of snapshots associated with the base storage structure, statistics relating to usage of storage space based on data of the base storage structure and the collection of snapshots. The base storage structure can be a base volume or a parent read-write snapshot from which read-only snapshots are created.

The machine-readable instructions include metadata checking instructions 604 to check metadata of a first snapshot to determine validity of references in the metadata and a presence of any child of the first snapshot or a grandparent of the first snapshot. The first snapshot can be a snapshot that is subject to a deletion. The metadata can include a reference table.

The machine-readable instructions include hint association instructions 606 to associate, based on the validity of the references in the metadata and the presence of any child or grandparent of the first snapshot, a hint with a metadata entry of a parent of the first snapshot to indicate that a metadata entry of the child or the grandparent is to be checked for determining whether shared storage space becomes storage space uniquely used by a second snapshot. The hint can be the CHK_SHARED_CHILD flag or CHK_SHARED_PARENT flag discussed further above. The shared storage space can be shared between the first snapshot (the snapshot subject to deletion) and a child of the first snapshot. In this case, the second snapshot is the child. Alternatively, the shared storage space can be shared between the parent of the first snapshot and a grandparent of the first snapshot. In this alternative case, the second snapshot is the parent.

The machine-readable instructions include statistics update instructions 608 to update, using the hint, the statistics relating to usage of storage space. In some examples, the updating of the statistics is performed as a background process. The updated statistics can include statistics of the base storage structure and/or statistics of snapshots other than the first snapshot.

In some examples, the updating of the statistics is performed during an I/O operation on the base storage structure or a deletion of another snapshot that is a parent of the first snapshot (e.g., the special handling scenarios 1, 2, and 3 discussed further above).

In some examples, the hint (e.g., the CHK_SHARED_CHILD flag) indicates that the metadata entry of the child is to be checked for determining whether the shared storage space shared between the first snapshot and the child becomes storage space uniquely used by the child. In such examples, the associating of the hint with the metadata entry of the parent is responsive to a respective metadata entry of the first snapshot including an invalid reference and the metadata entry of the parent including a valid reference. The machine-readable instructions can responsive to the hint, check the metadata entry of the child, and responsive to the metadata entry of the child containing a valid reference, determine that the shared storage space shared between the first snapshot and the child becomes storage space uniquely used by the child.

In further examples, the hint (e.g., the CHK_SHARED_PARENT flag) indicates that the metadata entry of the grandparent is to be checked for determining whether the shared storage space shared between the grandparent and the parent becomes storage space uniquely used by the parent. In such further examples, the associating of the hint with the metadata entry of the parent is responsive to a respective metadata entry of the first snapshot including a valid reference and the metadata entry of the parent including an invalid reference. The machine-readable instructions can responsive to the hint, check the metadata entry of the grandparent, and responsive to the metadata entry of the grandparent containing a valid reference, determine that the shared storage space shared between the grandparent and the parent becomes storage space uniquely used by the parent.

Figure 7:
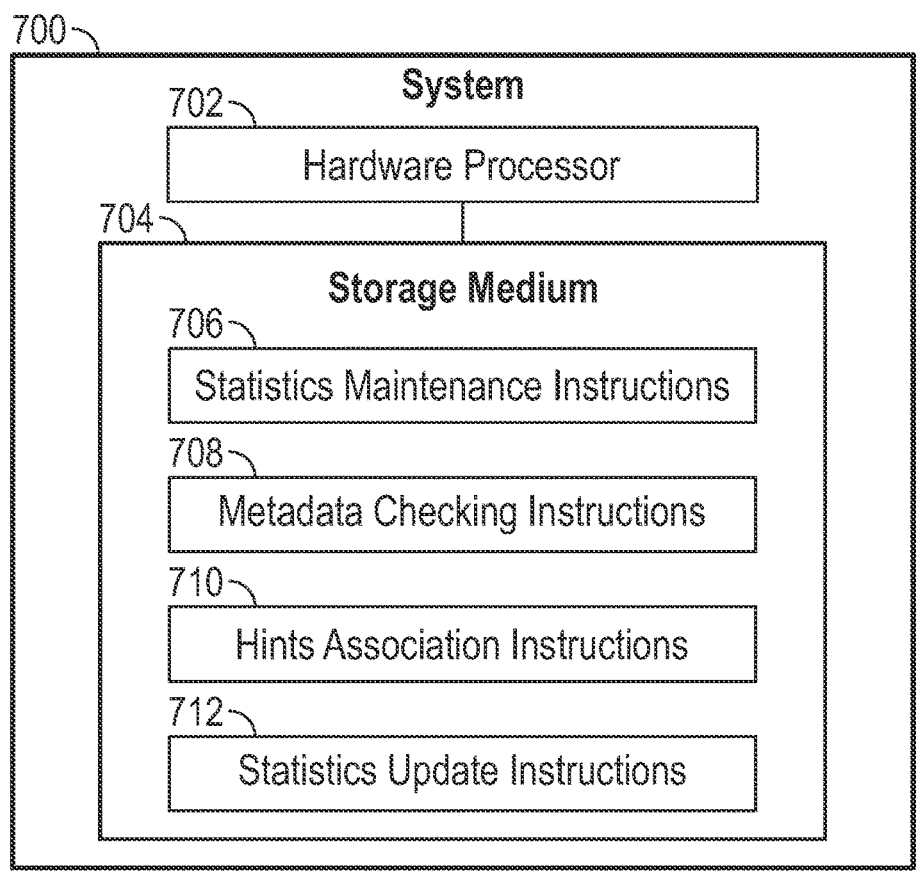
FIG. 7 is a block diagram of a system according to some examples.

FIG. 7 is a block diagram of a system 700 according to some examples. The system 700 includes a hardware processor 702 (or multiple hardware processors). A hardware processor can include a microprocessor, a core of a multi-core microprocessor, a microcontroller, a programmable integrated circuit, a programmable gate array, or another hardware processing circuit.

The system 700 includes a storage medium 704 storing machine-readable instructions executable on the hardware processor 702 to perform various tasks. Machine-readable instructions executable on a hardware processor can refer to the instructions executable on a single hardware processor or the instructions executable on multiple hardware processors.

The machine-readable instructions in the storage medium 704 include statistics maintenance instructions 706 to maintain, for a base storage structure and a collection of snapshots associated with the base storage structure, statistics relating to usage of storage space based on data of the base storage structure and the collection of snapshots. The statistics can include counts of used pages (referred to as "used pages counts" further above) of the base storage structure and the snapshots.

The machine-readable instructions in the storage medium 704 include metadata checking instructions 708 to check metadata of a first snapshot to determine validity of references in entries of the metadata and a presence of any child of the first snapshot or a grandparent of the first snapshot. The metadata can include a reference table that includes entries, some of which may include valid references and others of which may include invalid references.

The machine-readable instructions in the storage medium 704 include hints association instructions 710 to associate, based on the validity of the references in the entries of the metadata and the presence of any child or grandparent of the first snapshot, a first hint with a first metadata entry of a parent of the first snapshot to indicate that a metadata entry of the child is to be checked for determining whether shared storage space becomes storage space uniquely used by the child, and a second hint with a second metadata entry of the parent of the first snapshot to indicate that a metadata entry of the grandparent is to be checked for determining whether shared storage space becomes storage space uniquely used by the parent of the first snapshot.

The machine-readable instructions in the storage medium 704 include statistics update instructions 712 to update, during a background process using the first hint and the second hint, the statistics relating to usage of storage space.

Figure 8:
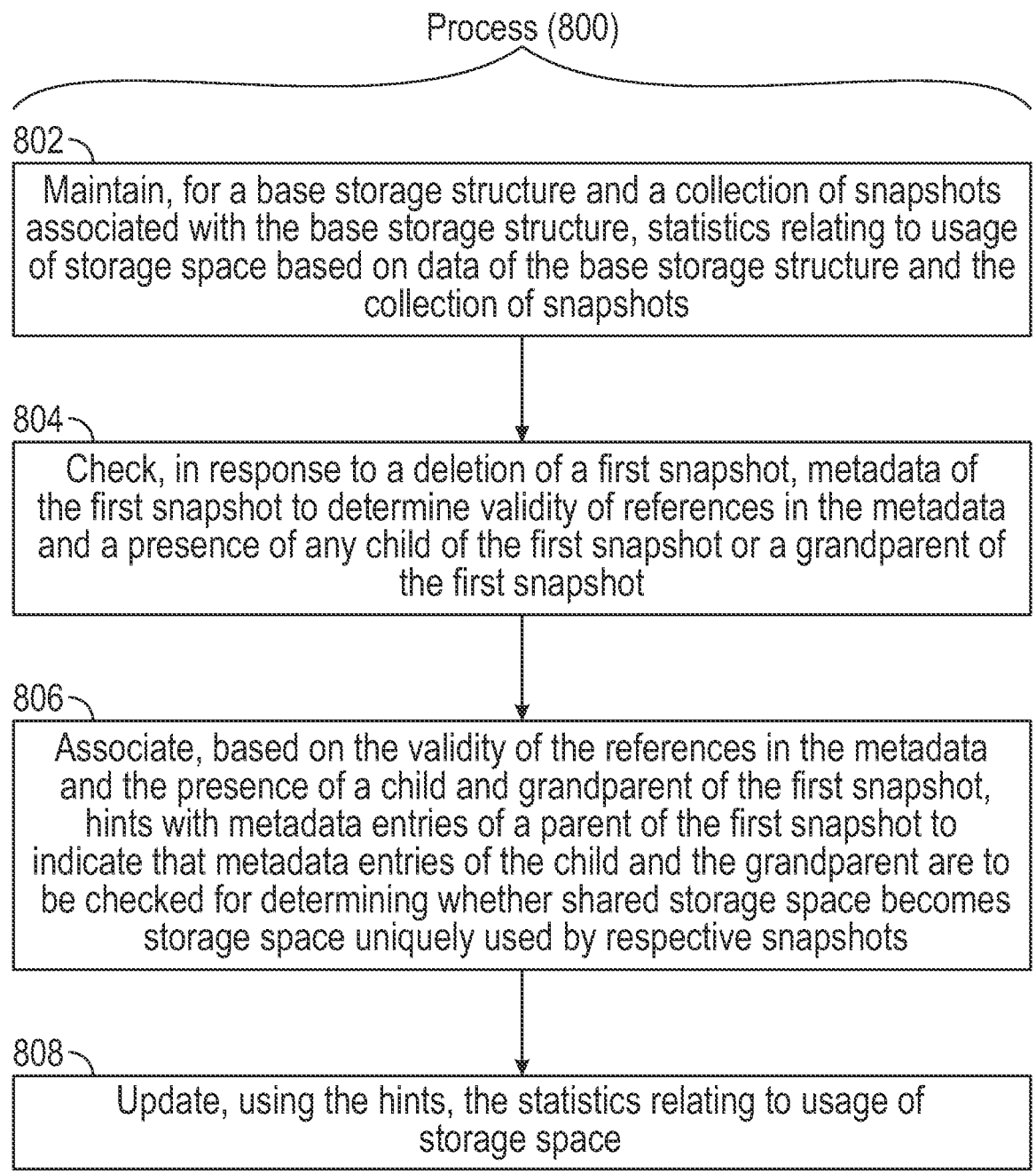
FIG. 8 is a flow diagram of a process according to some examples.

FIG. 8 is a flow diagram of a process 800 according to some examples. The process 800 may be performed by a system including a hardware processor. The process 800 includes maintaining (at 802), for a base storage structure and a collection of snapshots associated with the base storage structure, statistics relating to usage of storage space based on data of the base storage structure and the collection of snapshots.

The process 800 includes checking (at 804), in response to a deletion of a first snapshot, metadata of the first snapshot to determine validity of references in the metadata and a presence of any child of the first snapshot or a grandparent of the first snapshot.

The process 800 includes associating (at 806), based on the validity of the references in the metadata and the presence of a child and grandparent of the first snapshot, hints with metadata entries of a parent of the first snapshot to indicate that metadata entries of the child and the grandparent are to be checked for determining whether shared storage space becomes storage space uniquely used by respective snapshots. The hints can include the CHK_SHARED_CHILD flag and the CHK_SHARED_PARENT flag, for example, which are included in respective metadata entries.

The process 800 includes updating (at 808), using the hints, the statistics relating to usage of storage space.

A storage medium (e.g., 600 in FIG. 6 or 704 in FIG. 7) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   maintain, for a base storage structure and a collection of snapshots associated with the base storage structure, statistics relating to usage of storage space based on data of the base storage structure and the collection of snapshots;
   check metadata of a first snapshot to determine validity of references in the metadata and a presence of any child of the first snapshot or a grandparent of the first snapshot;
   add, based on the validity of the references in the metadata and the presence of any child or grandparent of the first snapshot, a hint comprising a flag set to a first value to a metadata entry of a parent of the first snapshot, the flag set to the first value indicating that a metadata entry of the child or the grandparent is to be checked for determining whether shared storage space becomes storage space uniquely used by a second snapshot; and
   update the statistics relating to usage of storage space by checking the metadata entry of the child or the grandparent based on the flag set to the first value.

2. The non-transitory machine-readable storage medium of claim 1, wherein the references in the metadata of the first snapshot comprise:
   a valid reference for a first page of data that indicates the first page of data is to be retrieved from the first snapshot in response to a read of the first page of data, and
   an invalid reference for a second page of data that indicates the second page of data is to be retrieved from an earlier snapshot in response to a read of the second page of data.

3. The non-transitory machine-readable storage medium of claim 1, wherein the checking of the metadata, the adding, and the updating are responsive to a deletion of the first snapshot.

4. The non-transitory machine-readable storage medium of claim 3,
   wherein the updating of the statistics is performed during an input/output (I/O) operation on the base storage structure or a deletion of another snapshot that is a parent of the first snapshot.

5. The non-transitory machine-readable storage medium of claim 2, wherein the instructions upon execution cause the system to:
   set the flag in the metadata entry of the parent to the first value based on the invalid reference for the second page of data in the metadata of the first snapshot and a valid reference for the second page of data in metadata of the base storage structure, wherein the flag set to the first value indicates that the metadata entry of the child is to be checked for determining whether the shared storage space shared between the first snapshot and the child becomes storage space uniquely used by the child, and wherein the parent is the base storage structure.

6. The non-transitory machine-readable storage medium of claim 5, wherein the valid reference for the second page of data in the metadata of the base storage structure indicates that the second page of data is present in the base storage structure, and
   wherein the metadata of the base storage structure further comprises an invalid reference for the first page of data to indicate that the first page of data is not present in the base storage structure.

7. The non-transitory machine-readable storage medium of claim 5, wherein the instructions upon execution cause the system to:
   responsive to the flag set to the first value, check the metadata entry of the child; and
   responsive to the metadata entry of the child containing a valid reference, determine that the shared storage space shared between the first snapshot and the child becomes storage space uniquely used by the child.

8. The non-transitory machine-readable storage medium of claim 7, wherein the updating of the statistics comprises one or more of updating a statistic for the child or updating a statistic for the base storage structure.

9. The non-transitory machine-readable storage medium of claim 1, wherein the flag set to the first value indicates that the metadata entry of the grandparent is to be checked for determining whether the shared storage space shared between the grandparent and the parent becomes storage space uniquely used by the parent.

10. The non-transitory machine-readable storage medium of claim 9, wherein the instructions upon execution cause the system to:
    set the flag in the metadata entry of the parent to the first value based on a valid reference for a first page of data in the metadata of the first snapshot and an invalid reference for the first page of data in metadata of the parent, wherein the parent is an intermediate snapshot between the first snapshot and the base storage structure, the intermediate snapshot created more recently than the first snapshot.

11. The non-transitory machine-readable storage medium of claim 10, wherein the instructions upon execution cause the system to:
responsive to the flag set to the first value, check the metadata entry of the grandparent; and
responsive to the metadata entry of the grandparent containing a valid reference, determine that the shared storage space shared between the grandparent and the parent becomes storage space uniquely used by the parent.

12. The non-transitory machine-readable storage medium of claim 11,
wherein the updating of the statistics comprises one or more of updating a statistic for the grandparent or updating a statistic for the parent.

13. The non-transitory machine-readable storage medium of claim 10, wherein the intermediate snapshot is created based on a read-write snapshot, and wherein the read-write snapshot is created based on the base storage structure.

14. The non-transitory machine-readable storage medium of claim 10, wherein the checking of the metadata, the adding, and the updating are responsive to a deletion of the first snapshot that is an earlier snapshot than the intermediate snapshot.

15. The non-transitory machine-readable storage medium of claim 1, wherein the instructions upon execution cause the system to:
associate, based on the validity of the references in the metadata of the first snapshot and the presence of any child or grandparent, a plurality of hints with respective metadata entries of the parent of the first snapshot to indicate that corresponding metadata entries of the child or the grandparent are to be checked for determining whether shared storage space becomes storage space uniquely used by the second snapshot,
wherein the updating of the statistics uses the plurality of hints.

16. The non-transitory machine-readable storage medium of claim 15, wherein the instructions upon execution cause the system to:
maintain a count of how many of the plurality of hints remain to be resolved.

17. A system comprising:
a processor; and
a non-transitory storage medium storing machine-readable instructions executable on the processor to:
maintain, for a base storage structure and a collection of snapshots associated with the base storage structure, statistics relating to usage of storage space based on data of the base storage structure and the collection of snapshots;
check metadata of a first snapshot to determine validity of references in entries of the metadata and a presence of any child of the first snapshot or a grandparent of the first snapshot;
associate, based on the validity of the references in the entries of the metadata and the presence of any child or grandparent of the first snapshot:
a first hint with a first metadata entry of a parent of the first snapshot to indicate that a metadata entry of the child is to be checked for determining whether shared storage space becomes storage space uniquely used by the child, wherein the first hint comprises a first flag set to a first value, and
a second hint with a second metadata entry of the parent of the first snapshot to indicate that a metadata entry of the grandparent is to be checked for determining whether shared storage space becomes storage space uniquely used by the parent of the first snapshot, wherein the second hint comprises a second flag set to the first value; and
update, during a background process using the first flag set to the first value and the second flag set to the first value, the statistics relating to usage of storage space.

18. The system of claim 17, wherein of the first flag set to the first value in association with the first metadata entry of the parent is responsive to a respective metadata entry of the first snapshot including an invalid reference and the first metadata entry of the parent including a valid reference, and
wherein the second flag set to the first value in association with the second metadata entry of the parent is responsive to a respective metadata entry of the first snapshot including a valid reference and the second metadata entry of the parent including an invalid reference.

19. A method of a system comprising a hardware processor comprising:
maintaining, for a base storage structure and a collection of snapshots associated with the base storage structure, statistics relating to usage of storage space based on data of the base storage structure and the collection of snapshots;
in response to a deletion of a first snapshot, checking, by the system, metadata of the first snapshot to determine validity of references in the metadata and a presence of any child of the first snapshot or a grandparent of the first snapshot;
adding, by the system based on the validity of the references in the metadata and the presence of a child and a grandparent of the first snapshot, hints with metadata entries of a parent of the first snapshot to indicate that metadata entries of the child and the grandparent are to be checked for determining whether shared storage space becomes storage space uniquely used by respective snapshots, wherein the hints comprise a first flag set to a first value in a first metadata entry of the parent, and a second flag set to the first value in a second metadata entry of the parent; and
updating, by the system using the hints comprising the first flag set to the first value and the second flag set to the first value, the statistics relating to usage of storage space.

20. The method of claim 19, wherein:
the first flag set to the first value indicates that a metadata entry of the child is to be checked for determining whether shared storage space becomes storage space uniquely used by the child, and
the second flag set to the first value indicates that a metadata entry of the grandparent is to be checked for determining whether shared storage space becomes storage space uniquely used by the parent of the first snapshot.

* * * * *